US008886719B2

(12) United States Patent
Houghton et al.

(10) Patent No.: US 8,886,719 B2
(45) Date of Patent: Nov. 11, 2014

(54) GROUP COMMUNICATION SYSTEM AND METHOD

(75) Inventors: Dan Houghton, London (GB); Antonio Varanda, London (GB); Tiago Loureiro, Tallinn (EE); Mike Bartlett, London (GB); Mikael Suvi, Tallinn (EE)

(73) Assignee: Skype, Dublin (IE)

( * ) Notice: Subject to any disclaimer, the term of this patent is extended or adjusted under 35 U.S.C. 154(b) by 1273 days.

(21) Appl. No.: 11/799,451

(22) Filed: May 1, 2007

(65) Prior Publication Data

US 2008/0010347 A1 Jan. 10, 2008

(30) Foreign Application Priority Data

May 2, 2006 (GB) .................................. 0608595.5

(51) Int. Cl.
| | |
|---|---|
| *G06F 15/16* | (2006.01) |
| *H04M 3/56* | (2006.01) |
| *H04L 29/06* | (2006.01) |
| *H04M 3/36* | (2006.01) |
| *H04L 29/08* | (2006.01) |

(52) U.S. Cl.
CPC ........... *H04M 3/56* (2013.01); *H04L 29/06027* (2013.01); *H04L 65/80* (2013.01); *H04M 3/367* (2013.01); *H04M 3/563* (2013.01); *H04M 3/565* (2013.01); *H04M 2203/5054* (2013.01); *H04L 65/1006* (2013.01); *H04L 65/4038* (2013.01); *H04L 67/36* (2013.01)
USPC .......................................... 709/204; 709/207

(58) Field of Classification Search
CPC .............. H04L 29/06027; H04L 67/36; H04L 65/1006; H04M 3/565; H04M 3/56; H04M 2203/5054
USPC .................... 709/204, 205, 206, 207
See application file for complete search history.

(56) References Cited

U.S. PATENT DOCUMENTS 6,175,822 B1 * 1/2001 Jones ........................... 704/270
6,304,648 B1  10/2001 Chang
(Continued)

FOREIGN PATENT DOCUMENTS

| CN | 101438559 | 5/2009 |
|---|---|---|
| GB | 2437785 | 11/2007 |

(Continued)

OTHER PUBLICATIONS

"International Search Report and Written Opinion", International Application No. PCT/GB07/001535, (Nov. 28, 2007), 17 pages.
"Search Report under Section 17", Application No. GB0608595.5, (Aug. 23, 2007), 2 pages.

(Continued)

*Primary Examiner* — Joseph Greene
(74) *Attorney, Agent, or Firm* — Sonia Cooper; Jim Ross; Micky Minhas

(57) ABSTRACT

A method is described for providing voice conferencing between a plurality of users over a communications network, the plurality of users comprising a host user and a plurality of participant users. The method comprises the host user initiating a voice conference using a host user terminal connected to the communications network. The plurality of users join the voice conference. Each of the plurality of users joins the conference by using a client executed at their respective user terminals, wherein on joining the voice conference the user terminal of each of the plurality of participant users displays a participant user interface and the user terminal of the host displays a host user interface. At least one of the plurality of participant users activates a request control on the participant user interface. The client transmits via the communication network a request to the host user to speak in the voice conference in response to the activation of the request control. The host user receives an indication on the host user interface of the request from the at least one of the plurality of participant users, and activates a selection control on the host interface to select from among the at least one of the plurality of users who transmitted the request, the speech of the at least one selected user being transmitted to all of the plurality of users over the communications network.

21 Claims, 18 Drawing Sheets

(56) References Cited

U.S. PATENT DOCUMENTS

| | | | |
|---|---|---|---|
| 6,807,563 B1 * | 10/2004 | Christofferson et al. | 709/204 |
| 6,915,331 B2 * | 7/2005 | Fuller et al. | 709/204 |
| 7,711,384 B1 * | 5/2010 | Szuszczewicz et al. | 455/519 |
| 8,392,836 B1 * | 3/2013 | Bau et al. | 715/739 |
| 2002/0065886 A1 | 5/2002 | Kim et al. | |
| 2004/0006595 A1 | 1/2004 | Yeh et al. | |
| 2004/0028200 A1 | 2/2004 | Carlson | |
| 2004/0037407 A1 | 2/2004 | Gourraud et al. | |
| 2005/0278424 A1 * | 12/2005 | White | 709/204 |
| 2007/0067387 A1 * | 3/2007 | Jain et al. | 709/204 |
| 2007/0190980 A1 * | 8/2007 | Britt et al. | 455/414.1 |
| 2007/0260686 A1 * | 11/2007 | Frydenlund et al. | 709/204 |
| 2007/0263824 A1 * | 11/2007 | Bangalore et al. | 379/202.01 |

FOREIGN PATENT DOCUMENTS

| | | | | |
|---|---|---|---|---|
| JP | 08298653 | 11/1996 | | |
| JP | 2003032753 | 1/2003 | | |
| WO | WO 01/52072 | 7/2001 | | |
| WO | WO 01/52072 A1 * | 7/2001 | | G06F 13/00 |
| WO | WO 2005/009019 A2 | 1/2005 | | |
| WO | WO 2005/041086 | 5/2005 | | |
| WO | WO-2007132149 | 11/2007 | | |

OTHER PUBLICATIONS

"Foreign Office Action", Chinese Application No. 200780015997.6, (Jun. 8, 2012), 10 pages.

"Foreign Office Action", Chinese Application No. 200780015997.6, (Sep. 13, 2012), 13 pages.

* cited by examiner

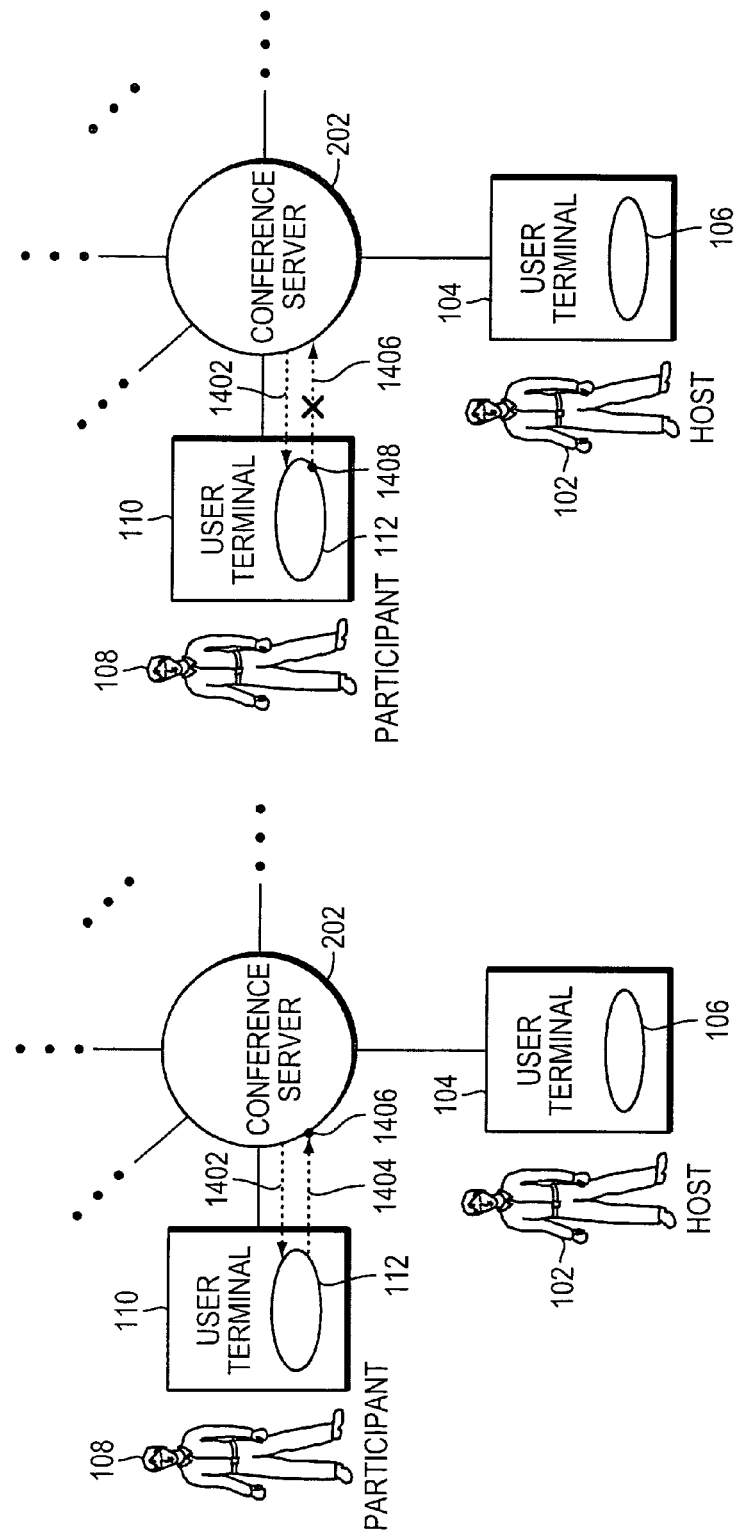

GROUP COMMUNICATION SYSTEM AND METHOD

RELATED APPLICATION

This application claims priority under 35 U.S.C. §119 or 365 to Great Britain Application No. GB 0608595.5, filed May 2, 2006. The entire teachings of the above application are incorporated herein by reference.

FIELD OF THE INVENTION

This invention relates to a group communication system and method, particularly but not exclusively for use in a peer-to-peer telecommunications system.

BACKGROUND OF THE INVENTION

Telephone conferencing systems enable telephone calls in which three or more people are connected and can participate in the same conversation. Telephone conferencing systems are a useful way of allowing a group of people to discuss a subject in an interactive manner, without the requirement for the people to be in the same physical location.

Telephone conferencing using the traditional public switched telephone network ("PSTN") is achieved by each participant in the conference dialing a pre-determined telephone number that connects the participant to a conference server (also called a conference bridge). The conference server answers the telephone calls from the multiple participants to the conference, and performs the function of mixing the voice signals from each participant together and distributing the mixed signals to all of the participants. In this way, each participant is able to hear what every other participant in the conference is saying.

In addition to using the traditional PSTN system, telephone conferencing can also be achieved using Internet telephony systems. Internet telecommunications systems allow the user of a device, such as a personal computer, to make telephone calls across a computer network such as the Internet. These systems are beneficial to the user as they are often of significantly lower cost than traditional telephony networks, such as fixed line or mobile networks. This may particularly be the case for long distance calls. These systems may utilise voice over internet protocol ("VoIP") over an existing network (e.g. the Internet) to provide these services, although alternative protocols can also be used. To use a Internet telephony service, the user must install and execute client software on their device. The client software provides the VoIP connections as well as other functions such as registration and authentication. A telephone call may be made using VoIP in accordance with methods known in the art, such as disclosed in WO 2005/009019.

Telephone conferencing using VoIP is performed in a similar manner to telephone conferencing using the PSTN. However, rather than using the PSTN to connect to the conference server, the terminals of the user connect to a conference server using the Internet. The VoIP conference server performs the decoding of VoIP audio streams from each of the participants in the conference, mixes the audio streams from the participants, encodes the mixed audio streams to VoIP, and distributes the mixed audio streams to all the participants via the Internet.

The use of peer-to-peer technology (and its associated low cost) and the ubiquitous nature of the Internet enables large numbers of users to come together from all over the world to discuss various subjects. However, the presence of a large number of participants in a telephone conference can give rise to significant problems. When the number of participants in a telephone conference are small, then a single conference server may be capable of handling all the connections from the participants. However, as the number of participants increases, the load on the conference server also increases. In particular, the CPU load increase as the number of participants increases. Therefore, for a conference server to support a large number of users, it must have a large amount of processing power. When the load on the conference server reaches a certain limit, then the conferencing server must either refuse the addition of more participants or risk becoming unstable due to overloading.

In addition to the above-mentioned issues regarding the handling of large numbers of users at the conference server, there are also other issues regarding the control and management of large conferences to consider. From a usability perspective, it becomes very difficult to manage a discussion over a telephone conference when the number of participants is large. This is because several people will tend to try and talk at any instance in time, leading to overlapping voices and confusion, which interrupts the flow of the discussion. This can particularly be the case if there is any delay present on the voice signals, as this can cause people to repeatedly talk over each other, leading to a stop-start type of conversation. In addition, there is also a problem with identifying a particular participant who is talking from a large group of people. When a person begins talking in a telephone conference containing a large group of people, the identity of the person talking may not be clear. This may require the person to be interrupted in order to establish their identity, and may in turn lead to the problems above of several people talking at once. These problems limit the usefulness of telephone conferences for discussions between large groups of people.

SUMMARY OF THE INVENTION

Therefore, as traditional telephone conferences are not able to handle large numbers of people, there is a need for a system for allowing large groups of people to communicate in a controlled manner.

According to one aspect of the present invention there is provided a method of providing voice conferencing between a plurality of users over a communications network, the plurality of users comprising a host user and a plurality of participant users, the method comprising:

the host user initiating a voice conference using a host user terminal connected to said communications network;

the plurality of users joining the voice conference, each of the plurality of users joining the conference by using a client executed at their respective user terminals, wherein on joining the voice conference the user terminal of each of the plurality of participant users displays a participant user interface and the user terminal of the host displays a host user interface;

at least one of the plurality of participant users activating a request control on the participant user interface, said client transmitting via said communication network a request to the host user to speak in the voice conference in response to the activation of the request control; and the host user receiving an indication on the host user interface of the request from the at least one of the plurality of participant users, and activating a selection control on the host interface to select from among the at least one of the plurality of users who transmitted the request, the speech of the at least one selected user being transmitted to all of the plurality of users over the communications network.

In one embodiment the method further comprises the step of blocking the speech from other users that have not been selected by the host user.

In another embodiment the method further comprises the step of displaying at the participant user interface and the host interface a list of the plurality of users in the voice conference. In another embodiment the list of the plurality of users in the voice conference indicates which of the plurality of users has been selected by the host user to speak in the voice conference.

In another embodiment the method further comprises the step of the host user activating a muting control associated with a participant user displayed on the host user interface, the speech of the associated participant user being blocked in response to the activation of said muting control.

In another embodiment the method further comprises the step of the host user activating a muting control associated with the plurality of participant users displayed on the host user interface, the speech of all the plurality of participant users being blocked in response to the activation of said muting control. In another embodiment the speech from the user blocked by the host user is blocked at a server in the communications network. In another embodiment the speech from the user blocked by the host user is blocked at the client of the user blocked by the host user.

In another embodiment the method further comprises the step of the host user activating a removal control associated a participant user displayed on the host user interface, the associated participant user being removed from the voice conference in response to the activation of the removal control.

In another embodiment the step of initiating a voice conference further comprises displaying details of the voice conference to the plurality of users.

According to another aspect of the present invention there is provided a system for providing voice conferencing between a plurality of user terminals over a communications network, the plurality of user terminals comprising a host user terminal and a plurality of participant user terminals, the system comprising:

a client executed at each of the plurality of user terminals for joining a user of each of the plurality of user terminals to a voice conference;

a participant user interface displayed on each of the plurality of participant user terminals comprising a request control for requesting to speak in the voice conference, the client being arranged to transmit a request message to the host user terminal in response to the activation of the request control;

a host user interface displayed on the host user terminal comprising an indication that at least one of the users of the participant user terminals is requesting to speak in the voice conference, the host user interface further comprising at least one selection control for selecting at least one of the users of the participant user terminals requesting to speak in the voice conference, the speech of the at least one selected users being transmitted to the plurality of user terminals over the communications network in response to the activation of said selection control.

In one embodiment the speech from other users that have not been selected by the user of the host use terminal are blocked from being transmitted to the plurality of user terminals over the communications network.

In another embodiment the participant user interface and the host interface is arranged to display a list of the users of the plurality of user terminals in the voice conference. In another embodiment the list of the plurality of users in the voice conference indicates which of the plurality of users has been selected by the user of the host user terminal to speak in the voice conference.

In another embodiment the host user interface further comprises a muting control associated with a user of a participant user terminal, the speech of the associated user being blocked in response to the activation of said muting control. In another embodiment the host user interface further comprises a muting control associated with the plurality of participant users, the speech of all the plurality of participant users being blocked in response to the activation of said muting control. In another embodiment the speech from the user blocked by the host user is blocked at a server in the communications network. In another embodiment the speech from the user blocked by the host user is blocked at the client of the user blocked by the host user.

In another embodiment the host user interface further comprises a removal control associated with a user of a participant user terminal, the associated user being removed from the voice conference in response to the activation of the removal control.

According to another aspect of the present invention there is provided a user terminal for providing voice conferencing over a communications network, comprising:

a client executed at the user terminal for joining a user of the user terminal to a voice conference;

a user interface displayed on the user terminal comprising a request control for requesting to speak in the phone conference, the client being arranged to transmit a request message to the user terminal of a host user in response to the activation of the request control.

According to another aspect of the present invention there is provided a user terminal for providing voice conferencing over a communications network, comprising:

a client executed at the user terminal for joining a user of the user terminal to a voice conference;

a user interface displayed on the user terminal comprising an indication that at least one user in the voice conference is requesting to speak in the voice conference, the user interface further comprising at least one selection control for selecting at least one of the users requesting to speak in the voice conference, the speech of the at least one selected user being transmitted to all of the users in the voice conference over the communications network in response to the activation of said selection control.

According to another aspect of the present invention there is provided a computer program product comprising program code means which when loaded into a computer controls the computer to carry out the method above.

According to another aspect of the present invention there is provided a method of managing a voice conference in which a plurality of users are connected to a first network entity, the method comprising the steps of:

receiving a request to add a new user to a voice conference at a control node;

the control node analysing a conference load on the first network entity and if the conference load exceeds a threshold, selecting another network entity and transmitting the request to said another network entity;

receiving the request from the control node at the another network entity, and determining whether the another network entity is currently included in the voice conference; and if the another network entity is not currently included in the voice conference, creating a bridging connection between the another network entity and the first network entity, connecting the new user to the another network entity, and adding the new user to the voice conference via said bridging connection.

In one embodiment the step of analysing the conference load further comprises the steps of: determining whether the first network entity can support the new user; if the first network entity cannot support the new user, checking whether a further network entity is currently included in the voice conference; if a further network entity is currently included in the voice conference, determining whether the further network entity can support the new user; if the further network entity is not currently included in the voice conference or cannot support the new user, selecting the another network entity.

In another embodiment the step of selecting the another network entity comprises selecting the least loaded available network entity.

In another embodiment the step of analysing the conference load comprises determining the CPU load. In another embodiment the step of analysing the conference load comprises determining the number of users connected to the first network entity.

In another embodiment the step of connecting the new user to the another network entity further comprises authenticating the new user prior to adding the new user to the voice conference.

In another embodiment the method further comprises the step of the control node accessing a database and determining whether a queried network entity has contacted the database within a predetermined time period, whereby, if the queried network entity has not contacted the database within the predetermined time period, the control node ceases to transmit requests to said queried network entity.

In another embodiment the step of creating a bridging connection further comprises the steps of determining whether the creation of the bridging connection has failed, and if so substituting the another network entity for the first network entity.

In another embodiment the method further comprises the steps of: monitoring the bridging connection between the another network entity and the first network entity; if the step of monitoring observes that the connection has failed, determining whether the first network entity has been substituted; and if the first network entity has not been substituted, substituting the another network entity for the first network entity.

According to another aspect of the present invention there is provided a system for managing a voice conference in which a plurality of users are connected to a first network entity, the system comprising:

a control node comprising means for receiving a request to add a new user to a voice conference, means for analysing a conference load on the first network entity, means for selecting another network entity if the conference load exceeds a threshold, and means for transmitting the request to said another network entity, and another network entity comprising means for receiving the request from the control node, means for determining whether the another network entity is currently included in the voice conference, means for creating a bridging connection between the another network entity and the first network entity, if the another network entity is not currently included in the voice conference, means for connecting the new user to the another network entity, and means for adding the new user to the voice conference via said bridging connection.

In one embodiment the means for analysing the conference load further comprises: means for determining whether the first network entity can support the new user; means for checking whether a further network entity is currently included in the voice conference if the first network entity cannot support the new user; means for determining whether the further network entity can support the new user if a further network entity is currently included in the voice conference; and means for selecting the another network entity if the further network entity is not currently included in the voice conference or cannot support the new user.

In another embodiment the means for selecting another network entity comprises means for selecting the least loaded available network entity.

In another embodiment the means for analysing the conference load comprises means for determining the CPU load. In another embodiment the means for analysing the conference load comprises means for determining the number of users connected to the first network entity.

In another embodiment the means for connecting the new user to the another network entity further comprises means for authenticating the new user prior to adding the new user to the voice conference.

In another embodiment the control node further comprises means for accessing a database and means for determining whether a queried network entity has contacted the database within a predetermined time period, whereby, if the queried network entity has not contacted the database within the predetermined time period, the control node ceases to transmit requests to said queried network entity.

In another embodiment the means for creating a bridging connection further comprises means for determining whether the creation of the bridging connection has failed, and if so substituting the another network entity for the first network entity.

In another embodiment the another network entity further comprises means for monitoring the bridging connection between the another network entity and the first network entity, means for determining whether the first network entity has been substituted if the means for monitoring observes that the connection has failed and means for substituting the another network entity for the first network entity if the first network entity has not been substituted.

BRIEF DESCRIPTION OF THE DRAWINGS

For a better understanding of the present invention and to show how the same may be put into effect, reference will now be made, by way of example, to the following drawings in which:

FIGS. 14A-B shows two embodiments for muting participants of a conference.

DETAILED DESCRIPTION OF THE INVENTION

Described herein is a system and method for allowing groups of people to interact in a controlled manner using voice communication. In a preferred embodiment of the invention, a number of users can participate in a voice conference discussion using VoIP (or another packet-based voice communication protocol). The system for providing the voice conferencing service is reliable and scalable for large groups of people. In addition, the system provides a technique for ensuring that the problems associated with large groups of people communicating on a shared medium are avoided, as will be discussed hereinafter.

Figure 1:
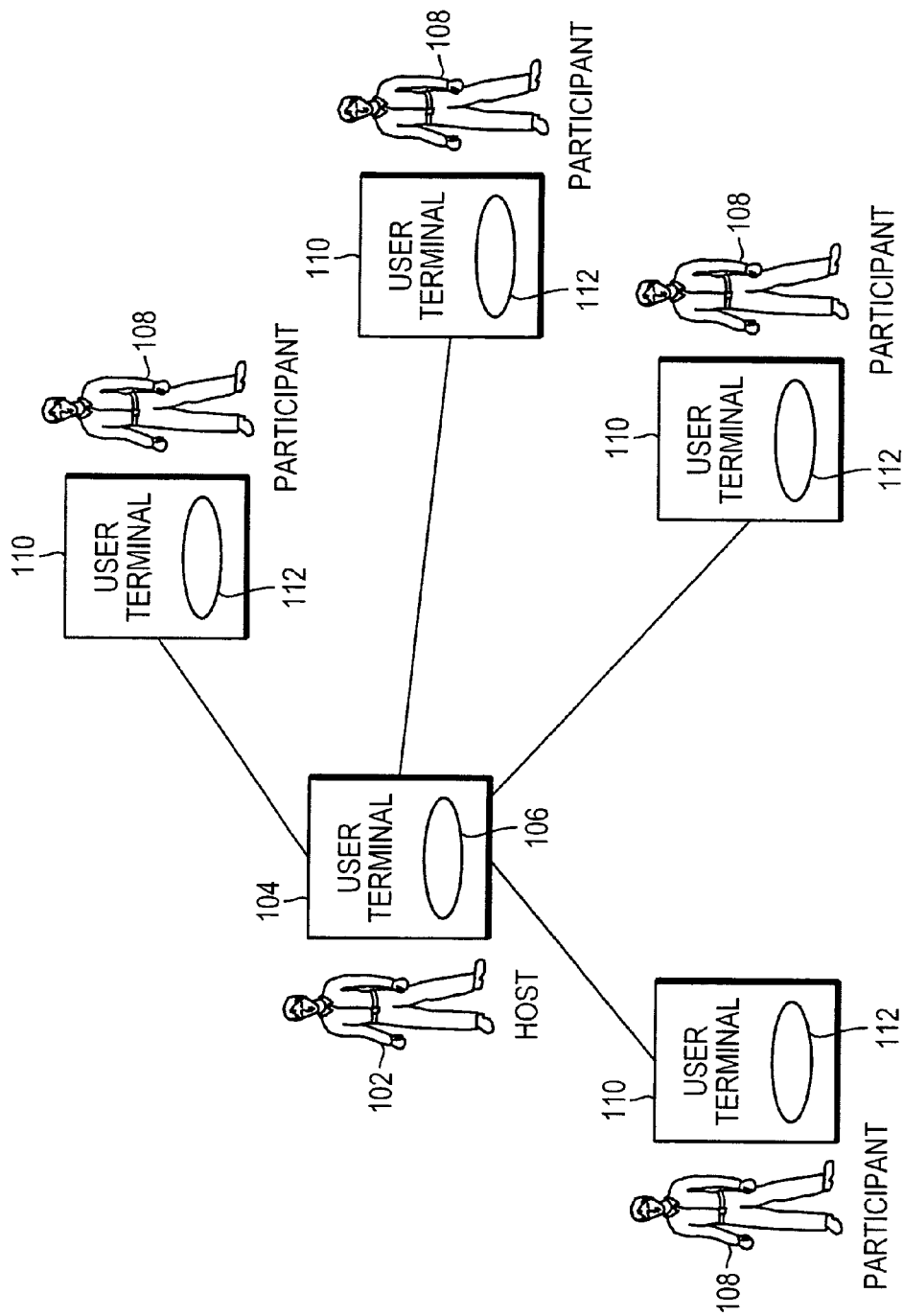
FIG. 1 shows a first embodiment for establishing a voice conference using VoIP.

Reference will first be made to FIG. 1, in which is shown a first embodiment for establishing a voice conference using VoIP. The first embodiment illustrates the case where only a small number of users are participating in the conference. This embodiment may be limited to, for example, only five users or less, although the skilled person will appreciate that this is an arbitrary number and the number of users can be limited to any suitable amount.

FIG. 1 shows a host user 102, who is operating a user terminal 104. The host 102 is the user that is establishing the voice conference. In other words, the host user 102 is setting up a new voice conference, as opposed to joining a pre-existing one. The procedure for setting up the voice conference from the perspective of the user is discussed later herein. The user terminal 104 may be a personal computer ("PC"), personal digital assistant ("PDA"), mobile phone, cordless telephone or other type of electronic device capable of connecting to a network.

Client software 106 is installed and executed on the user terminal 104. The client software 106 is provided by the operator of a telephony system, and allows the user of the terminal 104 to make VoIP calls to other users of the telephony system (or to other telephony systems). The user terminal 104 is connected to a network (not shown) via a network port, and may be connected via a cable (wired) connection or a wireless connection. The network may be the Internet.

The host user 102 has scheduled a voice conference to occur at a specific time and this has been advertised in advance (in accordance with methods described hereinafter). Other users are also present that have requested to join the conference, and are denoted participants 108 in FIG. 1. The participants 108 are operating user terminals 110 that may be similar to those of the host 102, and the terminals of the participants 108 are executing client software 112 similar to that of the host 102.

When the conference starts, each of the participants 108 are connected via VoIP to the user terminal 104 of the host 102. The VoIP audio stream from the users (both host and participants) is sent to the user terminal 104 of the host 102. The client software 106 executed on the user terminal 104 of the host 102 decodes the VoIP audio streams from all the users. The decoded audio streams are mixed, such that each user is provided with a mixed audio stream that includes the audio streams of each of the other users (but does not include the audio stream of the user for which the mixed stream is intended). Each of the mixed streams are then encoded and sent to the appropriate user. The reason that a different stream needs to be mixed and encoded for each user is that it is not desirable for a user's voice to be heard returning to the same user. This is particularly the case since there is a delay incurred in the transmission of the audio stream and the decoding/encoding process, and the user would therefore hear their voice delayed by a short period of time, which would be disconcerting to the user.

The voice conference can be set up in this manner due to the peer-to-peer ("P2P") nature of addressable network packet protocols, such as VoIP. This permits the decentralised connection of the participants to the user terminal 104 of the host 102.

However, this technique is only suitable for a limited number of users participating in the conference, due to the requirement to decode, mix and encode the audio streams at the client 106 of the host 102. The ability of the client 106 to achieve this may depend on the processing power of the user terminal 104, which is difficult to determine from the perspective of the operator of the telephony system. In addition, the data rate of the connection to the network of the user terminal 104 may not be sufficient to support a large number of participants.

Figure 2:
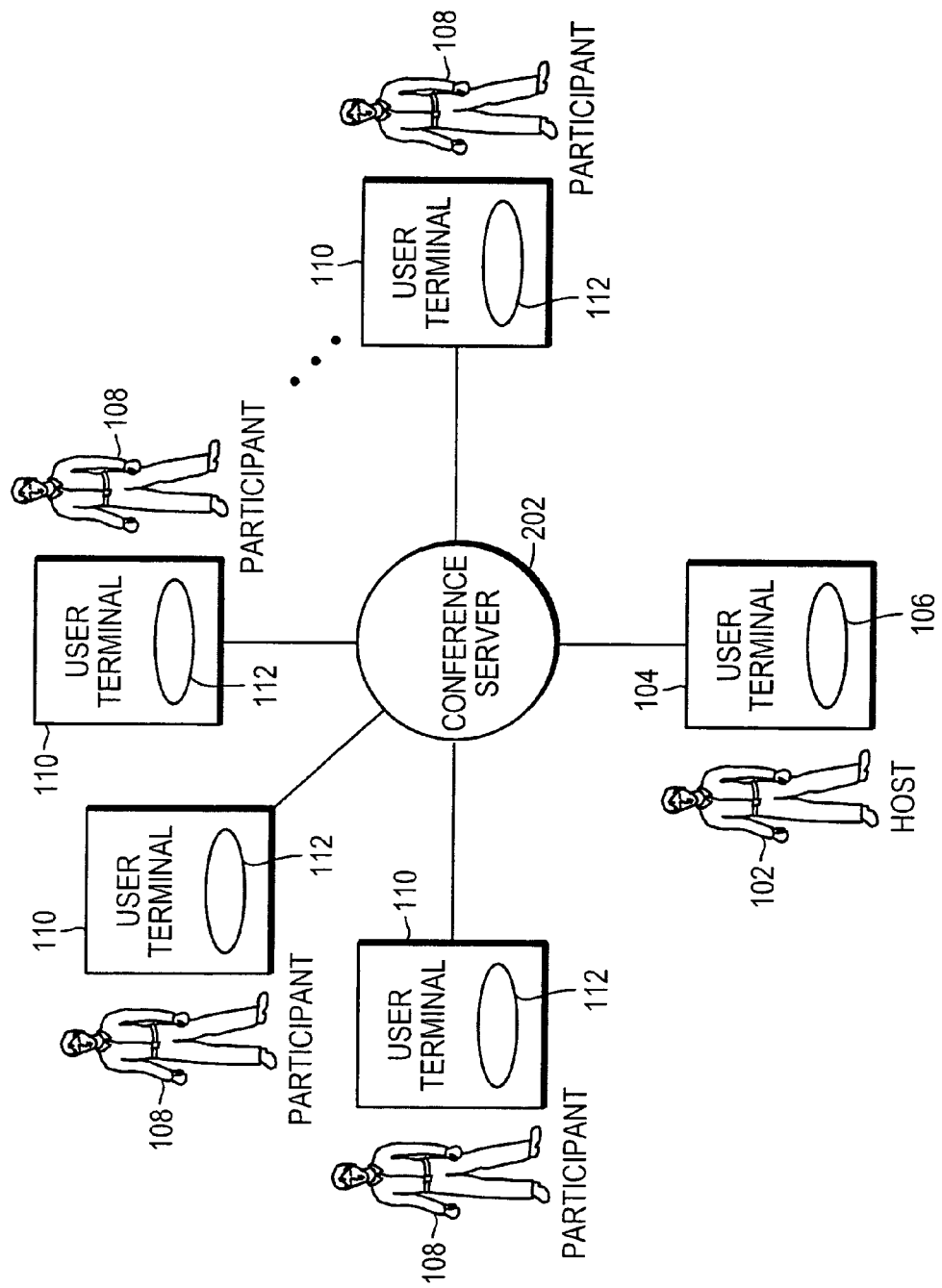
FIG. 2 shows a second embodiment for establishing a voice conference using VoIP.

If a conference is required for a larger number of users, then the system shown in FIG. 2 can be utilised. FIG. 2 shows a second embodiment for establishing a voice conference using VoIP. FIG. 2 illustrates a host user 102, using a terminal 104 which is executing client software 106 in the same manner as outlined above with reference to FIG. 1. The user terminal 104 is connected to a network via a network port as described above. The network may again be the Internet.

In the embodiment shown in FIG. 2, the host 102 has scheduled a conference for a large number of participants (using a method as will be described hereinafter). As a result of this, the system is not based on a P2P structure. Rather, the host 102 is connected to a centralised conference server 202, which may be remotely located in the network and operated by the operator of the telephony system.

Participants 108 (using user terminals 110 executing client software 112, as described with reference to FIG. 1) can join the conference at the scheduled time. However, rather than connecting directly to the user terminal 104 of the host 102, the participants 108 connect to the conference server 202. The conference server 202 is arranged to perform the function of decoding the VoIP audio streams from each of the users, and mixing and encoding audio streams to be sent to each of the users. Therefore, the same functionality as performed at the client software 106 of the host 102 described above with reference to FIG. 1 is now performed at the conference server 202.

As the conference server 202 is a dedicated server performing the tasks of decoding, mixing and encoding the audio streams, it is able to handle a significantly larger number of users participating in the voice conference. Furthermore, the conference server 202 can be connected to a fast data-rate network connection, to ensure that sufficient bandwidth is present to support the connections to all the users. Therefore, using the system shown in FIG. 2, a voice conference can be established for a relatively large number of participants.

In summary, if the voice conference has been scheduled for a small number of participants then the system shown in FIG. 1 can be used to operate the voice conference. In this case, there may be a strict limit set for the number of users that can join the conference (for example five users). If more users above this limit attempt to join the conference, then they may be blocked from joining. However, if the conference has been scheduled as a large conference, then the system shown in FIG. 2 is used, and a larger number of users are able to join the conference. Nevertheless, although the system shown in FIG. 2 can support a larger number of users, the conference server is still limited by its processing power and hence limited in the number of users it can support. Therefore, as the number of users in the conference increases, then the load on the conference server must be appropriately managed.

Figure 3:
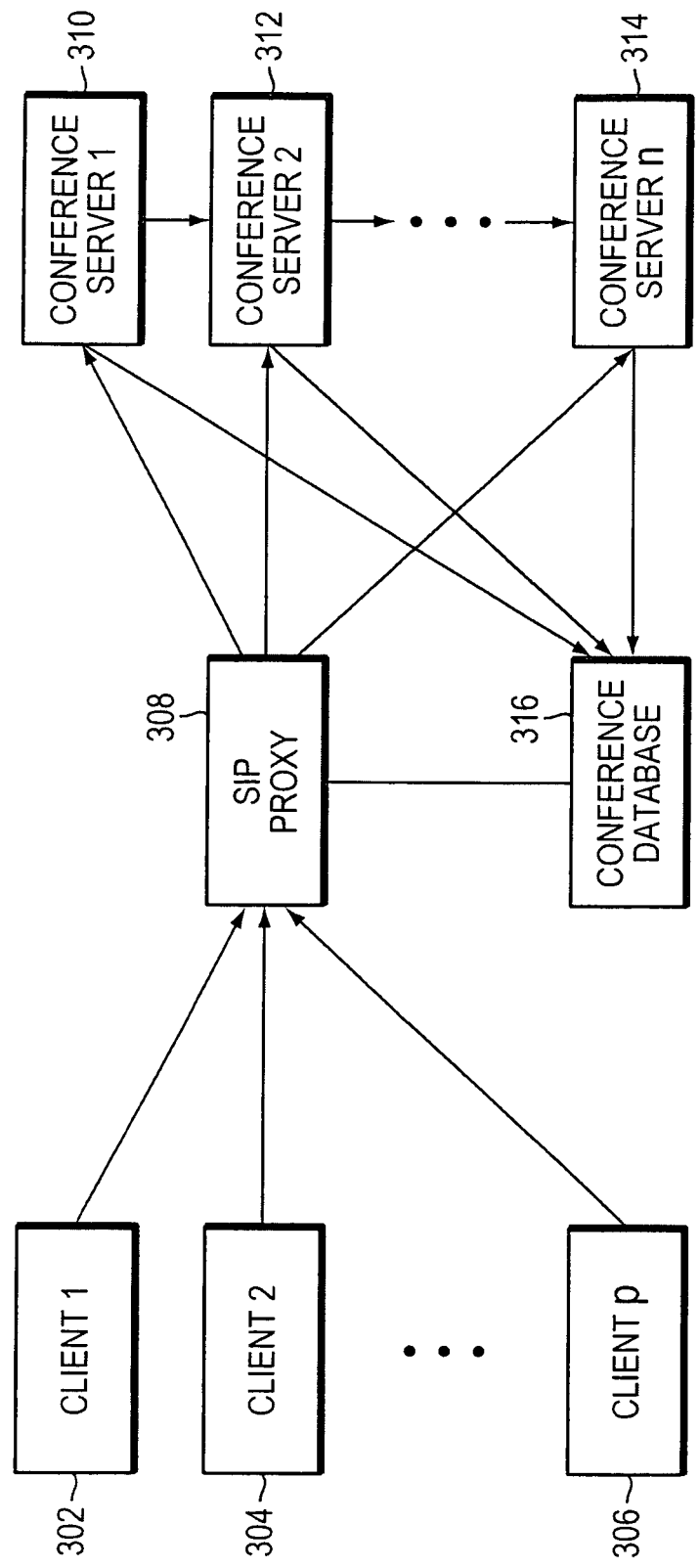
FIG. 3 shows a system for managing the load on conference servers.

The management of the conference servers is described with reference to FIGS. 3, 4 and 5. Reference is first made to FIG. 3, which shows the system for managing the load on the conference servers. FIG. 3 illustrates a number of clients (302-306) participating in a voice conference. In FIG. 3, there are p participants illustrated. The clients 302-306 are the same as those shown running on the user terminals in FIGS. 1 and 2.

The VoIP conference uses the known Internet session initiation protocol ("SIP") to initiate, control and terminate the voice sessions to the conference server. Each of the p clients 302-306 connects to a SIP proxy server 308. The SIP proxy server 308 is connected to all the available conference servers (310-314) that can be used to support VoIP conferences, and also a conferences database 316. FIG. 3 illustrates n conference servers. Each of the n conference servers can create a connection to any of the other conference servers. Each of the n conference servers are connected to the conferences database 316, which stores information about the ongoing conferences and servers. In particular, the conference servers 310-314 frequently update the conferences database 316 with information regarding their CPU load and the number of users supported by the server. This information can be used to determine how loaded the server is.

The operation of the load management system shown in FIG. 3 will now be described with reference to the flowcharts in FIGS. 4 and 5. FIG. 4 illustrates the process that occurs at the SIP proxy server 308 when a SIP request message arrives from a client 302-306.

In step S402, a SIP request message arrives at the SIP proxy server 308 from a client 302-306. Then, in step S404, the SIP proxy 308 interrogates the conferences database 316 to determine if the original conference server where the conference was booked can accept another user. This is determined by obtaining the CPU load and number of users from the conferences database 316, and comparing this to a threshold value. If the conference server where the conference was originally booked can accept another user, then in step S406 the message is forwarded to the original conference server. If, however, the original conference server cannot accept any new requests because it is too loaded, then at step S408 the SIP proxy 308 determines whether one or more other conference servers are also being used to support users for this conference. The process of spanning a conference over multiple servers is called "bridging", and is described in more detail hereinafter. The connection between the original conference server and the other server used to support users is called a "bridge connection" and the other server used to support users is called a "bridged conference server".

If the conference has been spanned over multiple servers and one or more bridged conference servers already exist for this conference, then at step S409 the SIP proxy checks with the conferences database 316 whether these bridged servers are already excessively loaded. If at step S410 the bridged servers are not excessively loaded, then in step S412 the SIP proxy forwards the SIP message to the least loaded bridged conference server.

If, however, it is determined in step S408 that no bridged conference servers already exist, or it is found in step S410 that all the bridged conference servers are excessively loaded, then at step S414 the SIP proxy 308 uses information from the conferences database 316 to determine which of the available conference servers is the least loaded. It is then determined in step S416 whether the least loaded server available is over its load limit. If the least loaded server is not over its load limit then the SIP proxy 308 forwards the SIP message to the least loaded server in step S418. Alternatively, in step S420, if the least loaded server is already over the load limit, then the SIP proxy 308 informs the user that they cannot join the conference with the message "temporarily not available" (SIP status code 480).

Figure 4:
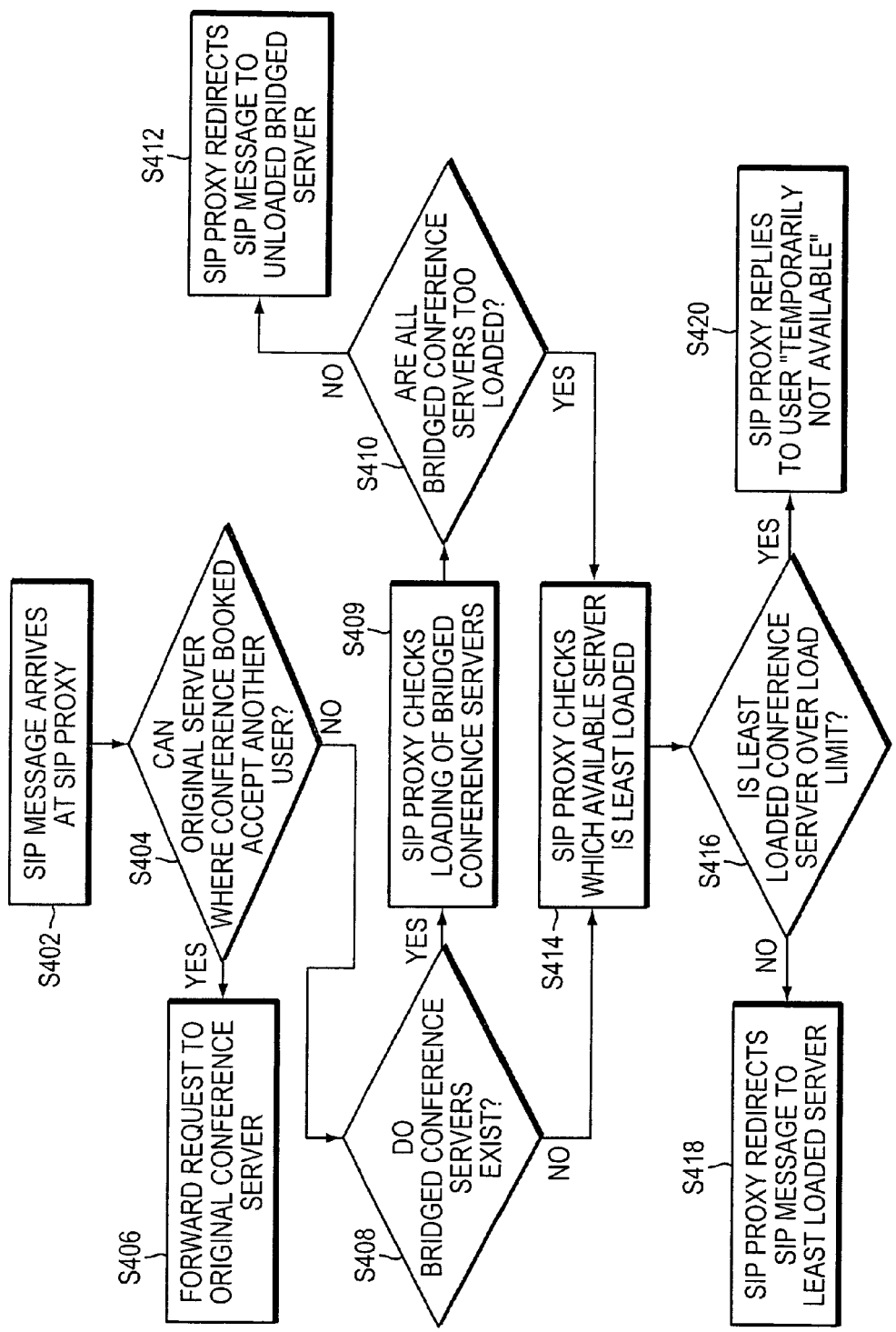
FIG. 4 shows a flowchart of a process for handling call requests at a SIP proxy.

The above description with reference to FIG. 4 outlined the operation of the process that occurs at the SIP proxy server 308 when a SIP request message arrives from a client 302-306. Reference is now made to FIG. 5, which outlines the process that is performed at a conference server (310-314) when a request is made for a user to join a conference. This can be either the first user to join the conference, or a new user joining an already established conference. The request to the conference server can be sent from the SIP proxy following steps S406, S412 or S418 as outlined above with reference to FIG. 4. In addition, the request can also be another conference server being added as a participant, as part of the process of creating a bridged server.

In step S502, the conference server receives the request to join a conference.

In step S504, the conference server determines the type of channel that is being used to connect to the server. In particular, it is determined in step S506 whether the client 302-306 is connecting directly to the conference server (via the SIP proxy 308), or whether the request is from another conference server (for example a bridged server) attempting to connect.

If a SIP request is received directly from the client, then, in step S508, the conference server checks with the conferences database 316 whether the conference specified in the request message is booked. If the conference is not booked in the database 316, the conference server sends a message back to the user stating that the conference number was invalid in step S510.

If the conference is booked in the database 316, the conference server checks in step S512 whether the conference was booked for this particular server. This is achieved by comparing the server prefix in the request message with the server prefix of the conference server that is performing the steps in FIG. 5.

If the conference server is the original server for which the conference was booked, then in step S514 the user is validated using the database 316, and then joins the conference at step S516.

Returning again to step S512, if the conference was not originally booked for this server, then in step S518 the server determines if this conference is already running on this server. If the conference is already running on this server (i.e. it is a bridged server for this conference) then at step S514 the user is validated using the database 316, and then joins the conference at step S516. If, however, the conference is not already running on this server then at step S520 the server creates a bridge connection to the server on which the conference was originally booked.

As mentioned, a bridged conference server is used to handle the load of further users when the original conference server is excessively loaded. Bridging operates by creating a direct connection between the two servers, and creating two new participants, one in the original server and one in the bridged server. The connection between the servers is used to transmit the voice signals from all the users in the bridged conference server to the original server as a single voice stream, and vice versa. Therefore, to the original server, the single voice stream from the bridged server (which comprises all the voice signals from the users of the bridged server) appears as if it was from a single participant (the new participant added as part of the bridging). Similarly, the bridged server receives all the voice signals from the original server through the new single participant added to the bridged server.

Following the creation of the bridge connection, the user is validated at step S514 using the database 316, and then joins the conference at step S516.

Returning again to step S506, if the request is from another conference server, then the step of validation can be skipped, as another conference server from the available servers under the control of the operator does not need to be validated, and the server can be added to the conference at step S522.

Figure 5:
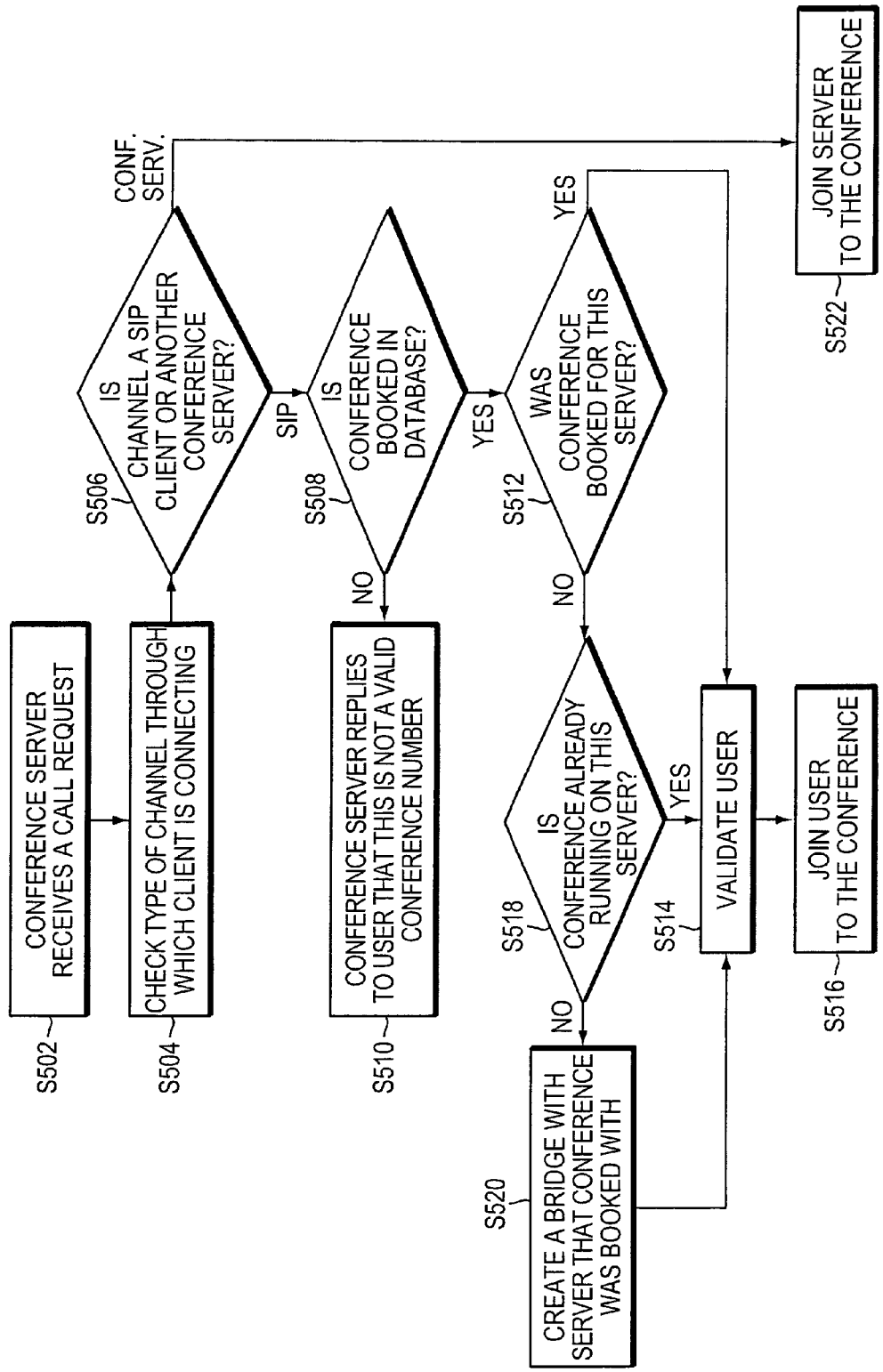
FIG. 5 shows a flowchart of a process for handling a call request at a conference server.

In summary, using the system shown in FIG. 3 and the processes shown in FIGS. 4 and 5, the load on the conference servers is managed. The processes shown operate to create a scalable structure of multiple conference servers as the load increases. Furthermore, this method of managing the load on the servers is also resilient in the case of failure, as will be described presently.

Figure 6A:
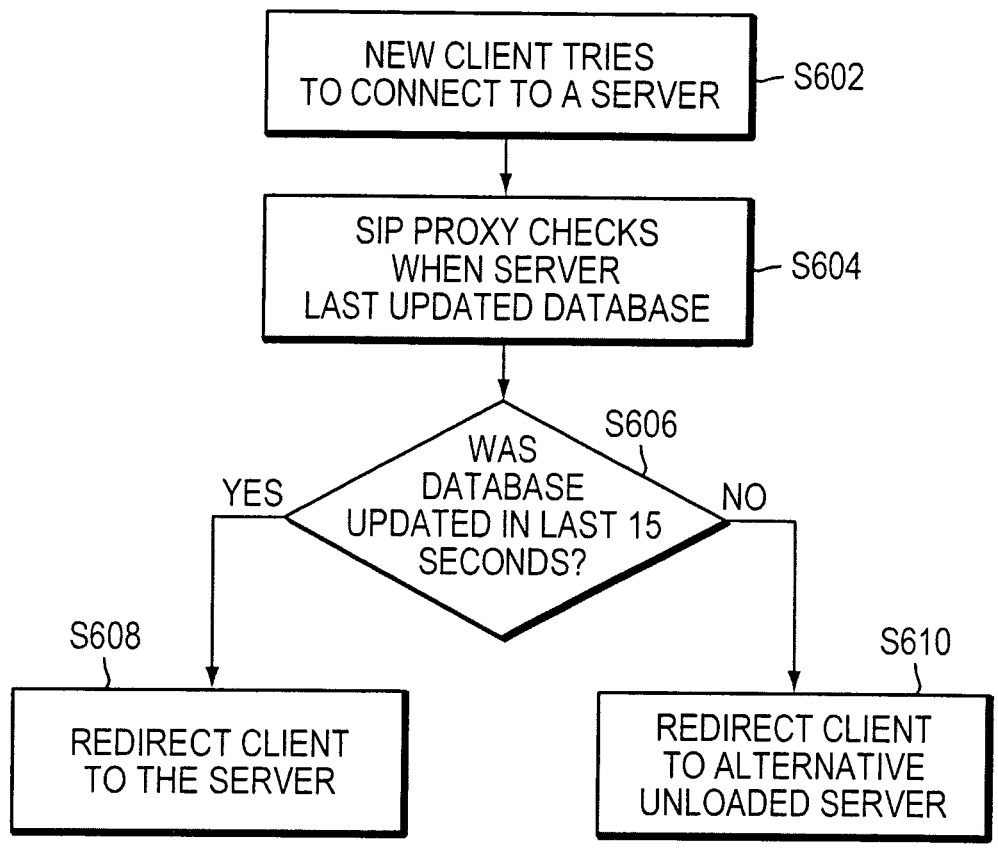
FIGS. 6A-C show flowcharts of the processes performed in the case of a failure in the conference servers.
Figure 6B:
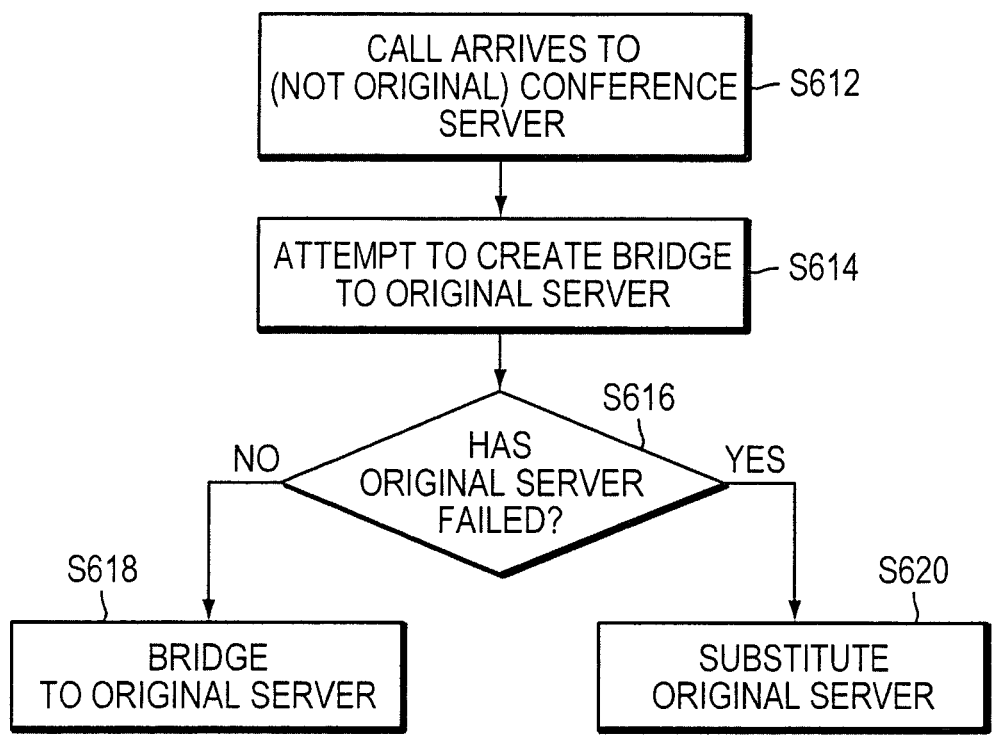
Figure 6C:
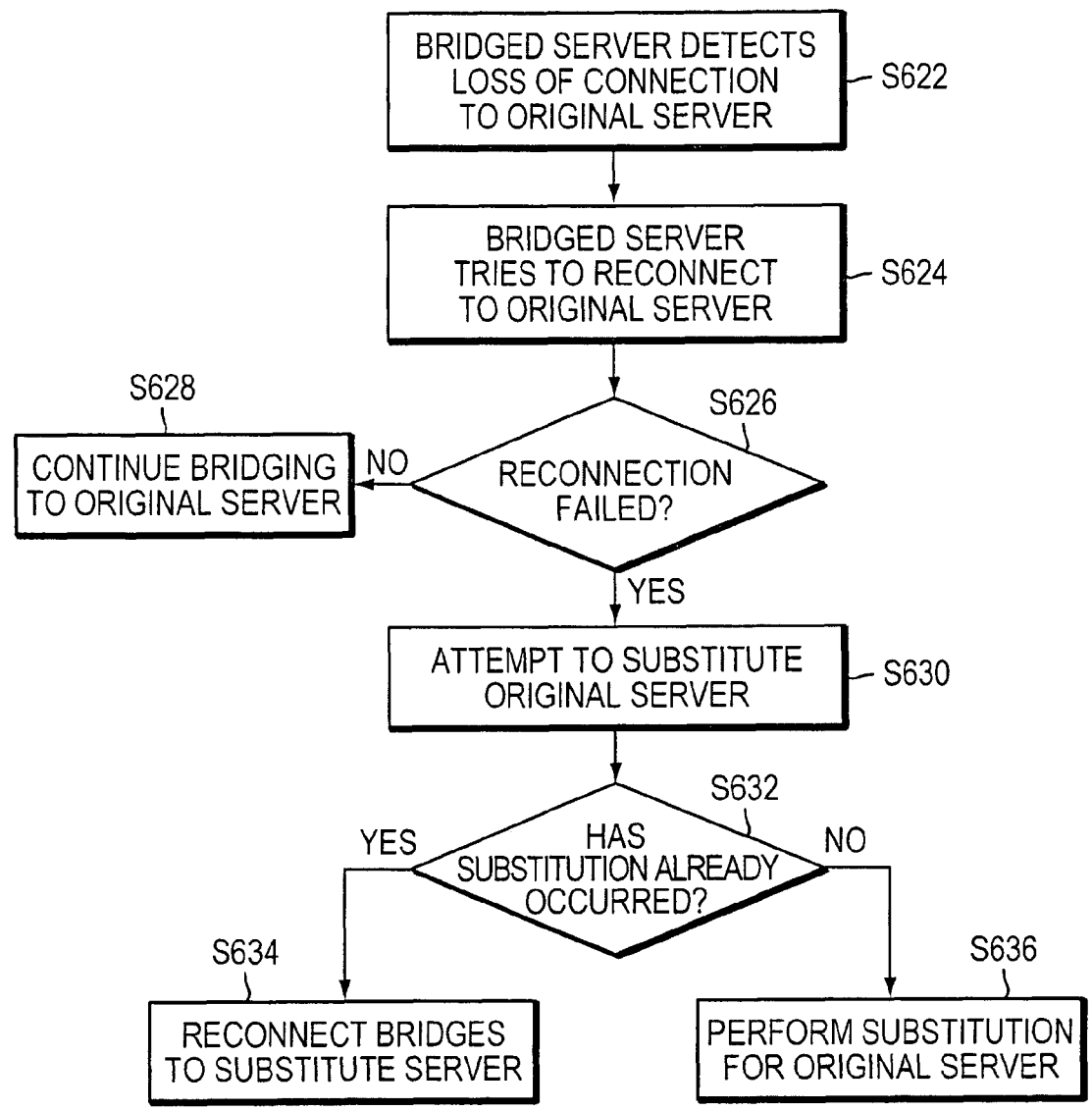

Reference is now made to FIG. 6A-C, in which are shown flowcharts illustrating the procedure in the case of a failure in the conference servers. The system is designed to manage failures in a controlled manner, and to substitute failed servers whenever possible to minimise disruption to conferences. This is known as the failover process.

Reference is first made to FIG. 6A, which shows the process performed by the SIP proxy server 308 (as illustrated in FIG. 3) in order to detect a failed conference server. In step S602 a client attempts to connect to a conference server via the SIP proxy 308. In step S604, the SIP proxy 308 checks when the last update to the conferences database 316 was made by the conference server. As mentioned previously, the conference servers 310-314 update the database 316 with information regarding their CPU load and number of users. If, however, there is a software or hardware failure of the conference server, these updates will cease. The SIP proxy server determines at step S606 whether the last update was longer than, for example, 15 seconds ago.

If the database 316 was updated within the last 15 seconds, then the request to the conference server can proceed as normal in step S608, as outlined previously in FIGS. 4 and 5. If, however, the database 316 was not updated in the last 15 seconds, then the SIP proxy server 308 determines that the conference server has failed. If this is the case, then in step S610 the SIP proxy server directs the call to an alternative unloaded server. The procedure for selecting the server to use can be the same as that outlined in FIG. 4 with regards to load management. Obviously, the timeout between updates can be any value and is not limited to the example of 15 seconds.

Reference is now made to FIG. 6B, which illustrates the process performed by a conference server 310-314 (as illustrated in FIG. 3) in the case of a new conference server attempting to set up a bridge connection to a failed server. This procedure only applies to servers that are not the original server on which the conference was established and on which a bridge connection does not already exist (i.e. the procedure shown in FIG. 5 has been performed up to step S522). The server is also assumed to be sufficiently unloaded to allow it to support the new user.

In step S612 a call arrives to the conference server (which is not the original server). This call could be directed to the server by the process shown in FIG. 6A, if the original server has been detected as failed. Alternatively the call could be directed to the server by the load management processes shown in FIG. 4. As this is not the original server and does not currently have a bridge connection to the original server, at step S614 this server will attempt to set up a bridge connection to the original server. The conference server determines if the attempt to set up the bridge connection has failed in step S616.

If the attempt to set up the bridge connection succeeds, then the original server has clearly not failed, and the procedure can continue as normal in step S618 (see FIG. 5). However, if the original server has failed, then the attempt to set up the bridge connection will fail, and the original server will not respond to the connection request. In this case, in step S620, the new conference server will attempt to substitute the original server, as will be described in more detail below.

Reference is now made to FIG. 6C, which illustrates the process performed by a conference server 310-314 (as illustrated in FIG. 3) in the case of a bridged conference server detecting a failure in the original server. The process shown in FIG. 6C only applies in the case of a conference server which is not the original server, which has an existing bridge connection to the original server.

In step S622 the bridged server detects the loss of the connection to the original server. Then, in step S624, the bridged server attempts to reconnect to the original server, and in step S626 it is determined whether the reconnection attempt failed. If the reconnection attempt succeeded, then the original server has not failed, and the bridge connection can continue as before in step S628. If the reconnection attempt failed, however, the bridged server will attempt to substitute the failed original server in step S630.

Firstly, the bridged server will check whether a substitution has already occurred in step S632. The substitution may already have been made to another server, since the original failed server may have had several bridged servers connected to it, which may have previously detected the failure and performed the substitution. All of the bridged servers connected to the original failed server may attempt to substitute the original server, but only one of them will be able to update a table in the conferences database 316 and become the substitute.

If it is determined in step S632 that a substitute has already been made, then in step S634 the bridged server is reconnected to the substitute server. Alternatively, if it is determined that a substitute has not already been made, then in step S636 the server performs the process of substituting for the failed original server. Therefore, the process outlined in FIG. 6C allows a single bridged server to substitute the original server, and all the other bridged servers that may have been connected to the original server will reconnect to the substitute. In this way, only the calls on the original failed server will be dropped from the conference, and the calls on the other bridged servers can continue to speak to each other.

The process of substitution of a server is not only used in the case of the failover processes outlined above with reference to FIGS. 6B and 6C. The substitution process is also used whenever a conference server needs to be deactivated for the purposes of bug fixing or updating/upgrading. In these instances a method is required of deactivating the server whilst maintaining ongoing conferences and providing a way for conferences booked to occur on a server to be held even if the server is taken down.

To perform the substitution process a type of software tool is used to trigger an event. The server to be deactivated is put in an inactive state and the least loaded of the available conference servers is chosen to substitute the inactive server. From this moment on, no more conferences will be booked for the inactive server until it is reactivated.

When a new client attempts to join a conference booked for the inactive server, the client is redirected to the substitute server. The substitute server checks if this conference is already running on it. If the conference is already running on the substitute server, the new client is added to the conference. If the conference is not already running on the substitute server, then the substitute server checks the conferences database 316 to determine whether there are still clients connected to the inactive server in this conference. If there are still existing clients connected to this conference on the inactive server, then the substitute server creates a bridge connection to the inactive server so that the new client on the substitute server can talk to the pre-existing clients in the conference. If there aren't any pre-existing clients in the conference connected to the inactive server, then the substitute server can create the conference and add the new client to it.

The inactive server can only be totally deactivated when there are no more bridge connections or clients connected thereto. Furthermore, once the server has been deactivated, it can only be reactivated again once there are no users in any of the conferences originally booked for the deactivated server. This is because the participants in the conference on the substitute server cannot be moved from the substitute server to the reactivated server, and any new users would attempt to join the reactivated server, and not the substitute where the conference was actually ongoing. When the server is reactivated, it updates the database 316 to activate itself in the server list and removes the substitute server. The above procedure therefore provides a method of substituting a server without interrupting ongoing conferences.

When users leave a conference, the resources must be released as appropriate. In particular, when a user leaves a conference and the user was connected to a bridged conference server, the bridged server checks if the user was the last user connected to it. If the user was the last user connected to the bridged server, the server removes bridge connection to the original server, and updates the database to remove the record of the conference being held on the bridged server.

The above description details the structure of the conferencing system and outlines the procedures performed in the network to manage the conference. Described hereinafter is the operation of the conferencing system from the perspective of the user. This outlines the techniques used to manage the issues associated with large groups of people communicating on a shared medium, as mentioned previously.

The users can create, view and join conferences using a webpage provided by the operator of the conferencing system and client software installed and executed on the user terminals of the users. An example of a webpage 700 provided by the operator of the conferencing system can be seen illustrated in FIG. 7. The user views the webpage 700 by executing a web browser program on the user terminal and navigating to the address of the webpage 700.

Figure 7:
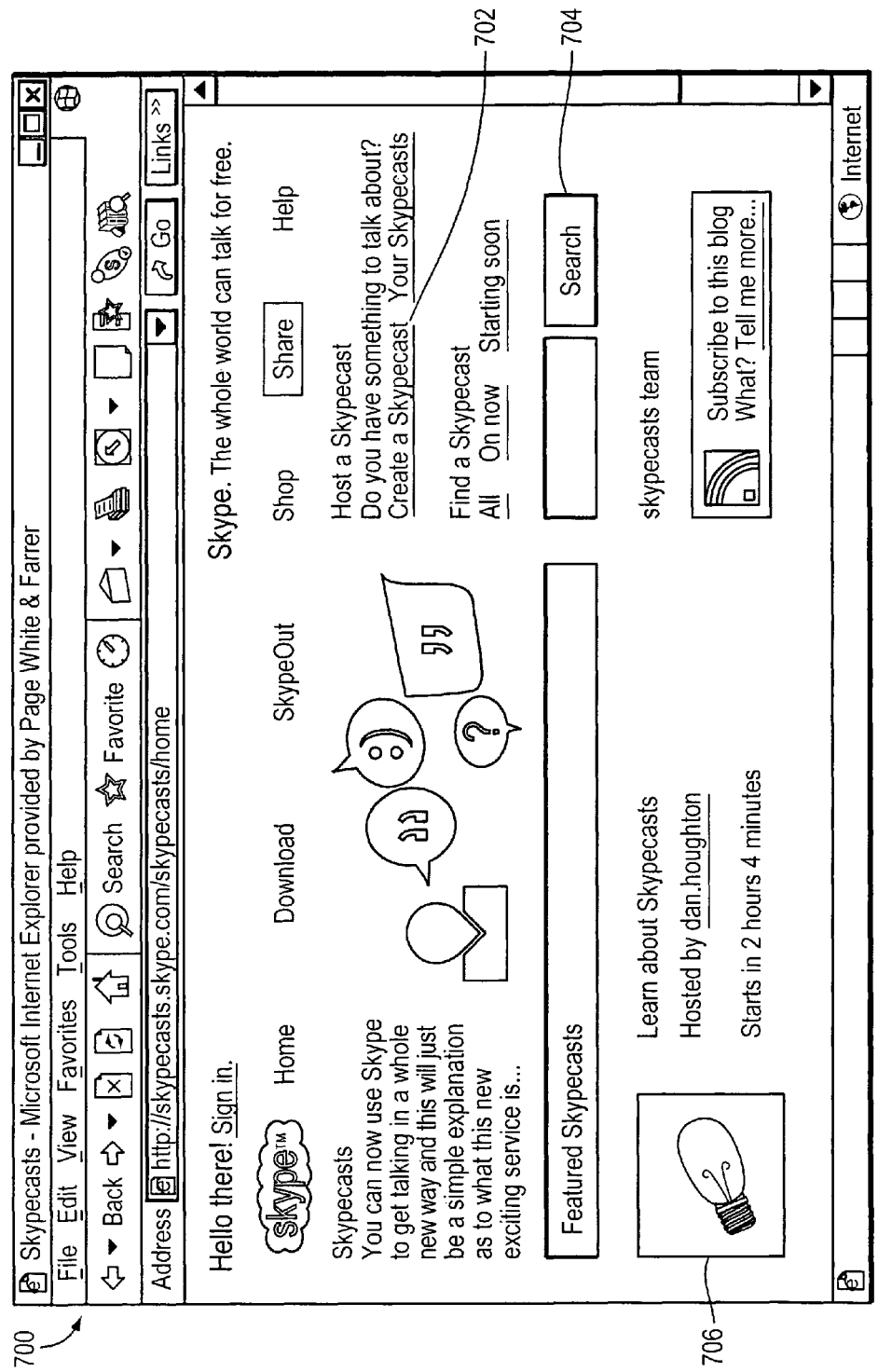
FIG. 7 shows a webpage for creating, viewing and joining conferences.

A conference is created and scheduled by a user using the webpage 700 such as that illustrated in FIG. 7. The webpage 700 contains a hyperlink 702 labelled "Create a Skypecast". The user can use a pointing device to click on this link 702 to begin the process of creating and scheduling a conference.

Figure 8A:
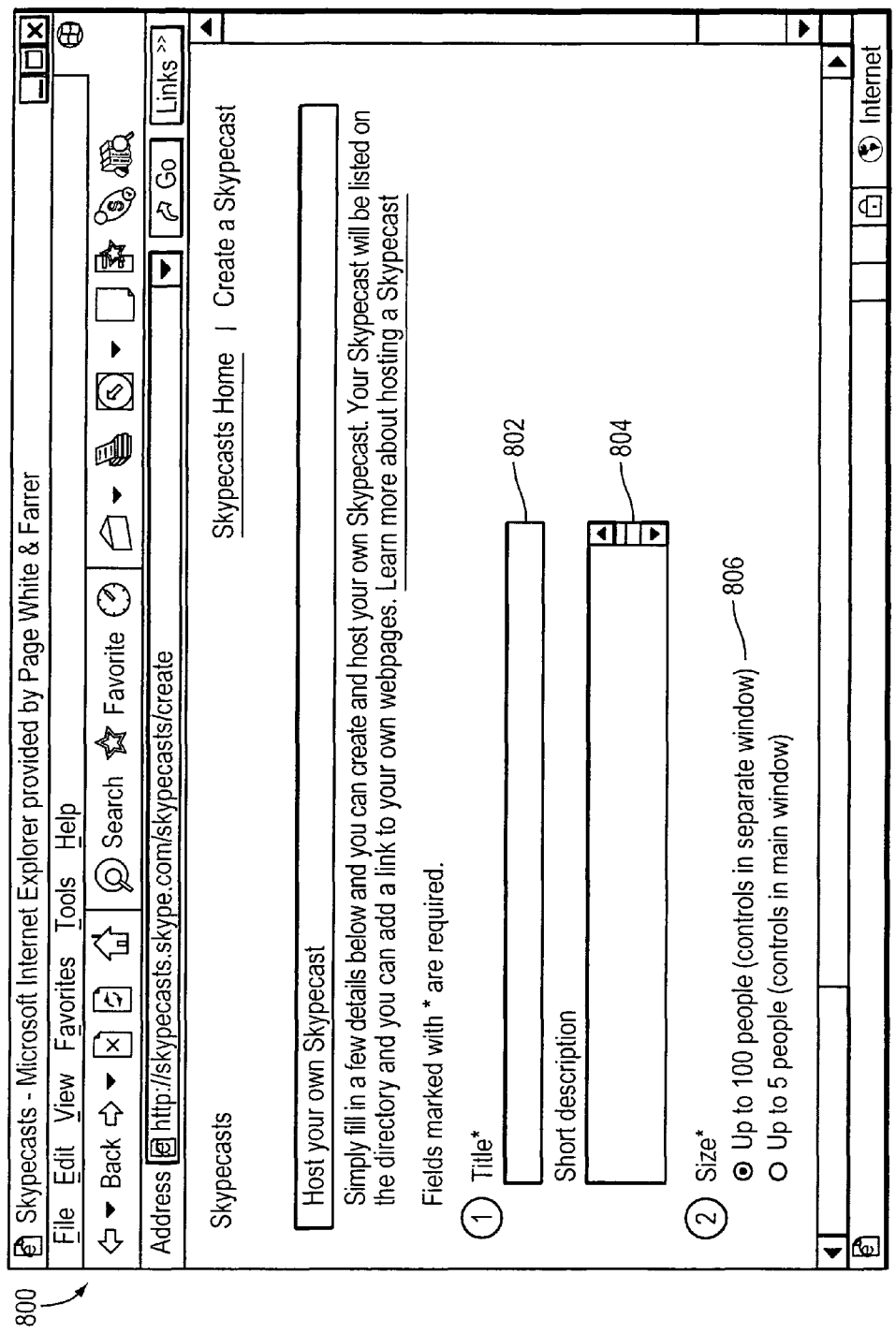
FIG. 8A-B shows a webpage for entering conference creation details.

Upon clicking the link, the user's web browser navigates to a conference creation webpage 800 such as that shown in FIG. 8A. The conference creation webpage 800 comprises a form for the user to enter information regarding the conference that user wishes to create. The form comprises a first field 802 for the user to enter a title to be displayed for the conference, and an optional second field 804 for the user to enter a short description of the subject matter of the conference.

The user makes a selection using buttons 806 regarding the size of the conference to be set up. In the example webpage 800 shown in FIG. 8A, the user has two options for the size of the conference, either up to 100 people or up to 5 people. The selection by the user determines the maximum number of users that can connect to the conference. In particular, this selection determines whether the conference will be established using the peer-to-peer structure as described above with reference to FIG. 1, or using the centralised server structure as described above with reference to FIG. 2.

Figure 8B:
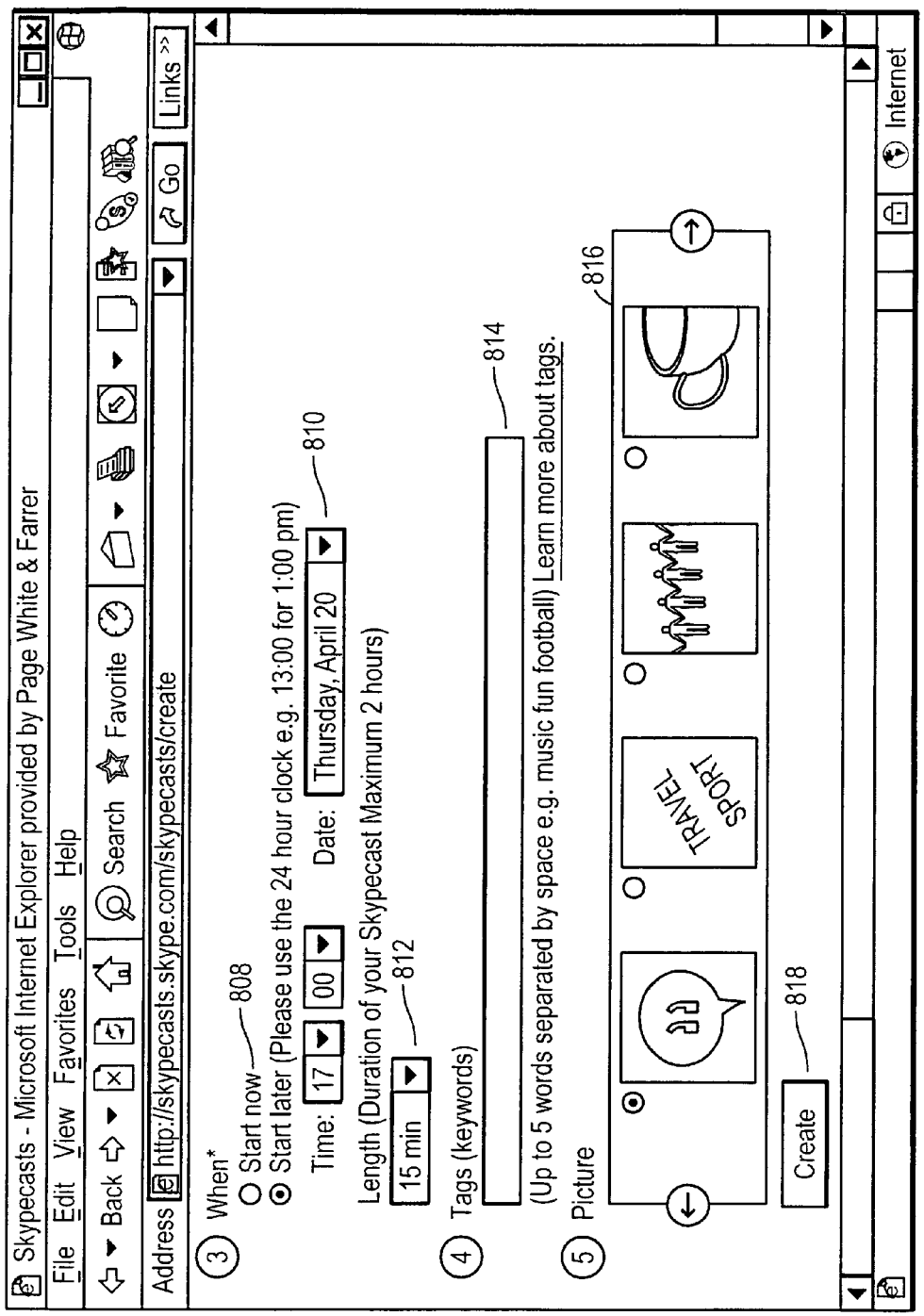

The form on the webpage 800 continues in FIG. 8B, which illustrates the lower portion of the form to which the user has scrolled. In the next section of the form the user selects from the buttons 808 to determine whether the conference starts immediately, or whether it starts at a specified time. If user has selected to start the conference at a specified time, the user enters the time using the options for time and date from the drop-down lists 810. The user also defines the duration of the conference using the drop-down list 812.

The user can optionally enter a keyword (known as a "tag") in field 814. The tags can be used to define the subject matter of the conference. In particular, the tags can provide information on the subject of the conference that may not be clear from the title defined in field 802. For example, the tag may be a general keyword such as "music" or "football", which may not be explicitly referred to in the title of the conference. The tags are used when a user is searching for a conference on a particular subject. For example referring again to FIG. 7, a search field 704 is shown on the webpage 700, into which the user may enter a search term and in response to which scheduled or ongoing conferences related to the search term will be displayed to the user. The searching functionality can utilise the information contained in the tags to return results that are relevant to a particular subject.

The user can optionally choose a picture to be associated with the conference from a selection such as those shown in 816. When the above information has been entered in to webpage 800 the user can create the conference by clicking on the button 818 labelled "Create". By entering the information in the webpage 800 and creating the conference the user becomes the host of the conference. The host of the conference has specific control over the operation of the conference as will be discussed hereinafter. If the conference was set up as a large conference, it will be allocated a conference server which acts as the original server as referred to with regards to FIGS. 4 and 5. The allocation of the conference server may be based on a random allocation, although other methods of allocating a server may also be used.

Figure 9:
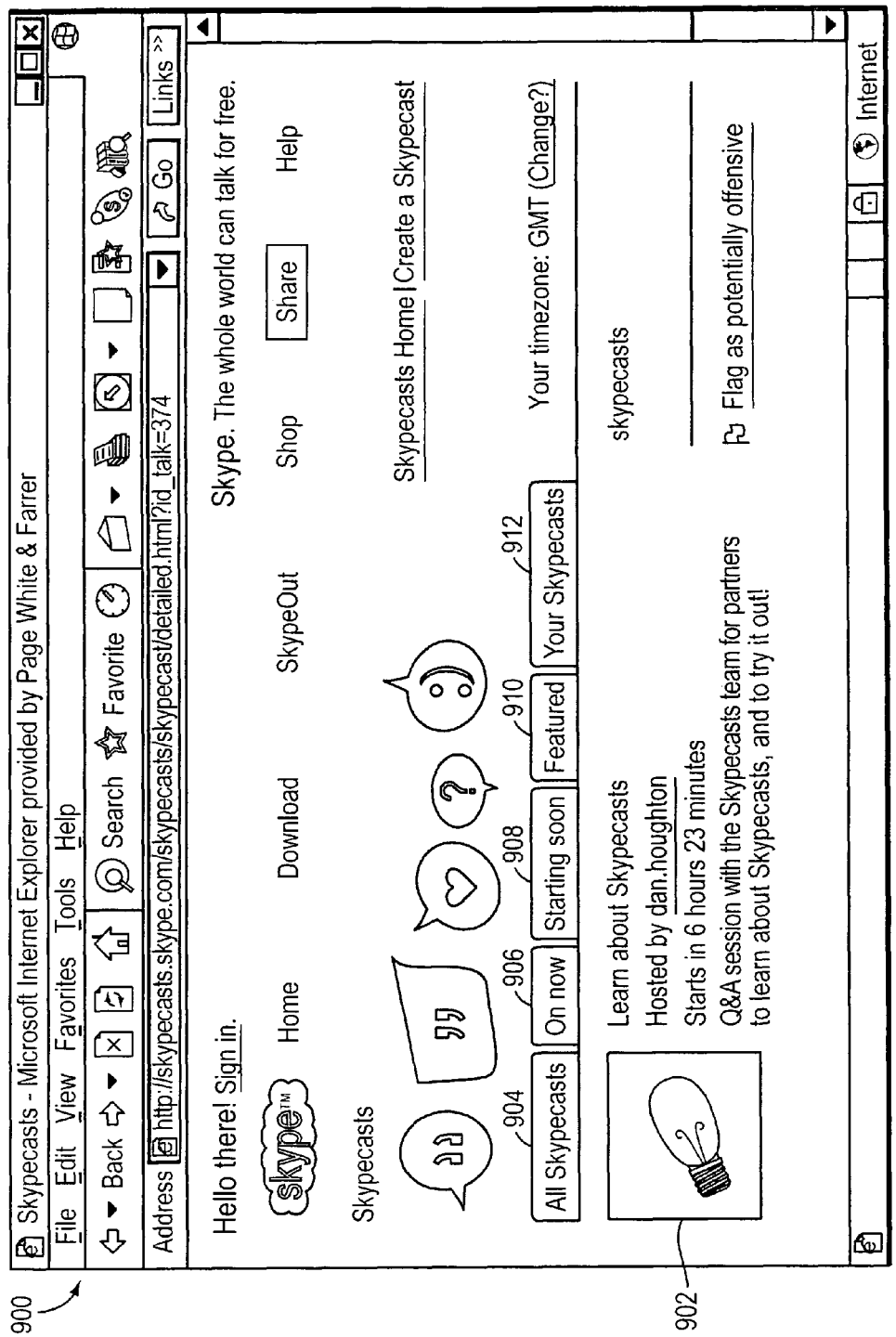
FIG. 9 shows a guide webpage displaying scheduled conferences.

Once a conference has been created by a user it is listed on a "guide" webpage, such as that shown in FIG. 9. The guide webpage 900 displays the conferences that are currently ongoing or are scheduled to occur. This can be structured in a similar manner to a "TV guide", in that the conferences are listed in the order in which they are to start. For example the webpage 900 shows an example conference 902 entitled "Learn about Skypecasts" which is listed along with the name of the host user and the scheduled start time of the conference. The user can also select different tabs to change which conferences are listed in the guide. For example, the user can choose to see all current and scheduled conferences by selecting tab 904, only ongoing conferences by selecting tab 906, only conferences starting soon by selecting tab 908, featured conferences selected by the operator by clicking on tab 910, or only those conferences for which the current user is the host by clicking on tab 912. Featured conferences may also be listed on the main conference webpage 700 shown in FIG. 7, such as the conference 706 entitled "Learn about Skypecasts".

Figure 10:
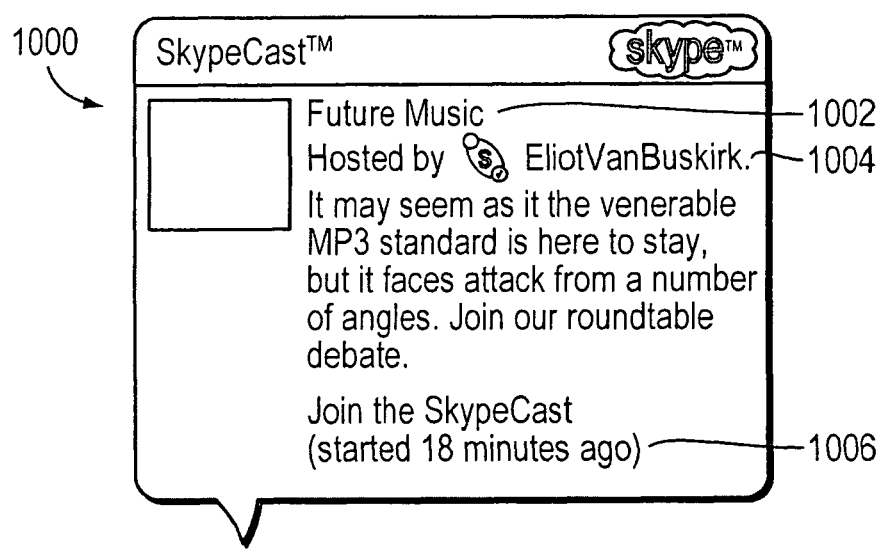
FIG. 10 shows an announcement box displaying a scheduled conference.

In addition to the guide webpage 900 shown in FIG. 9 and the webpage 700 shown in FIG. 7, conferences can also be listed on other webpages which are not operated by the operator of the conference system. For example, conferences can be listed on third party webpages using an announcement box such as that illustrated in FIG. 10. The announcement box 1000 provides information regarding the title of the conference 1002, the host of the conference 1004 and the time at which the conference is scheduled/started 1006. The announcement box can be included in third party webpages to publicise a conference discussion related to the subject matter of the third party webpage. An announcement box may be included in the third party webpage in the form of a hypertext markup language ("HTML") snippet or as an RSS feed in accordance with techniques known in the art.

A user can join a conference (either one that is about to start, or one that is currently ongoing) by clicking on a link marked "Join the Skypecast" which is shown against the conference listed on the guide webpage 900, on the main webpage 700, or on a third party webpage in an announcement box 1000. When the "join" link is clicked by the user, the client software executed on the user terminal dials a number associated with the conference that is to be joined. The number to dial is stored along with the conference details, but may not be directly visible to the user. The dialing of the number causes the client software to connect to the conference server in accordance with techniques described hereinabove.

A user cannot join a conference that has not yet started. However, the user is able to select a link labelled "Remind me" associated with a conference that the user wishes to join. When the desired conference is about to start, the user is sent a prompt to remind him to join the conference.

Figures 11A, 11B:
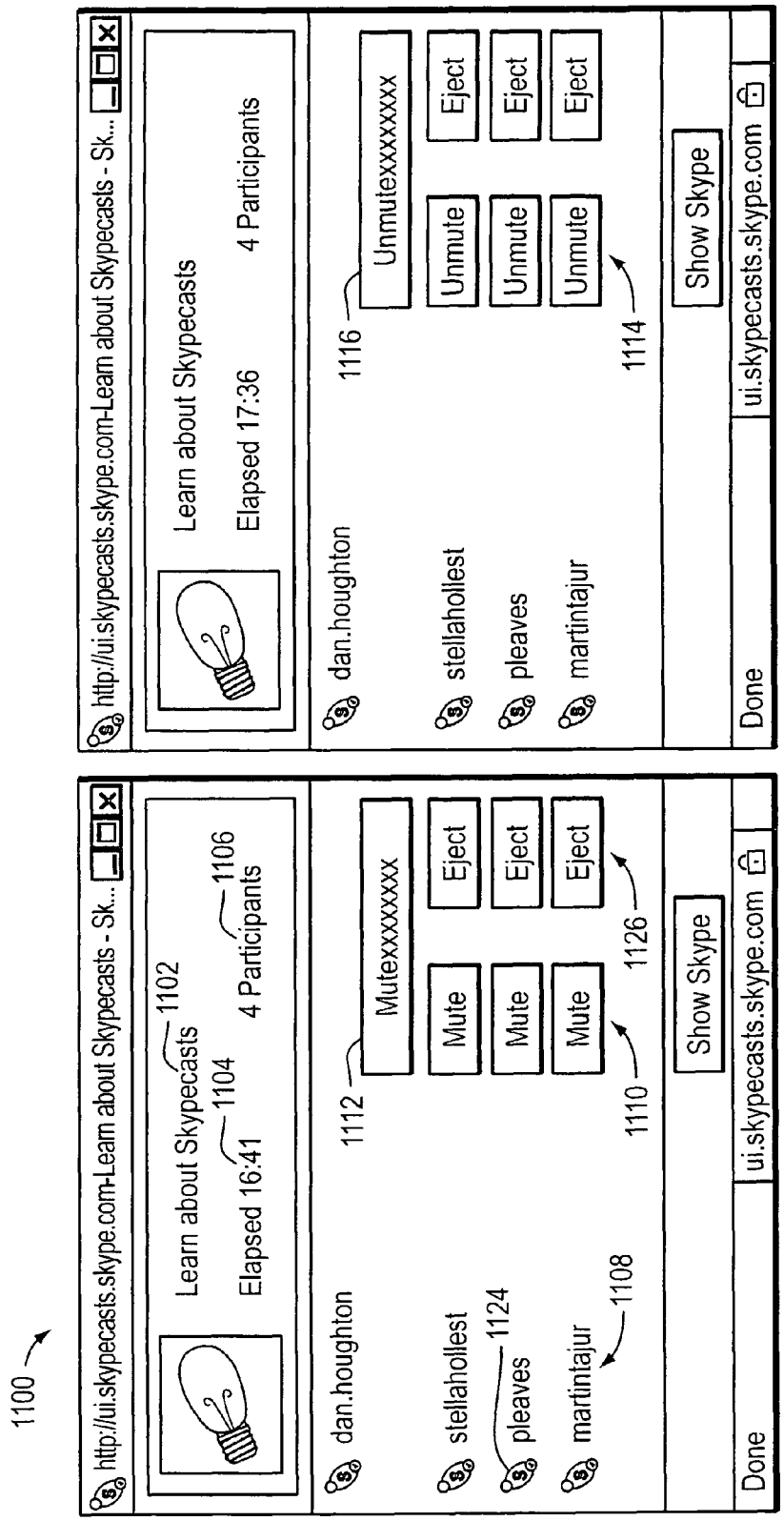
FIGS. 11A-C show a control window presented to the host of an ongoing conference.
Figure 11C:
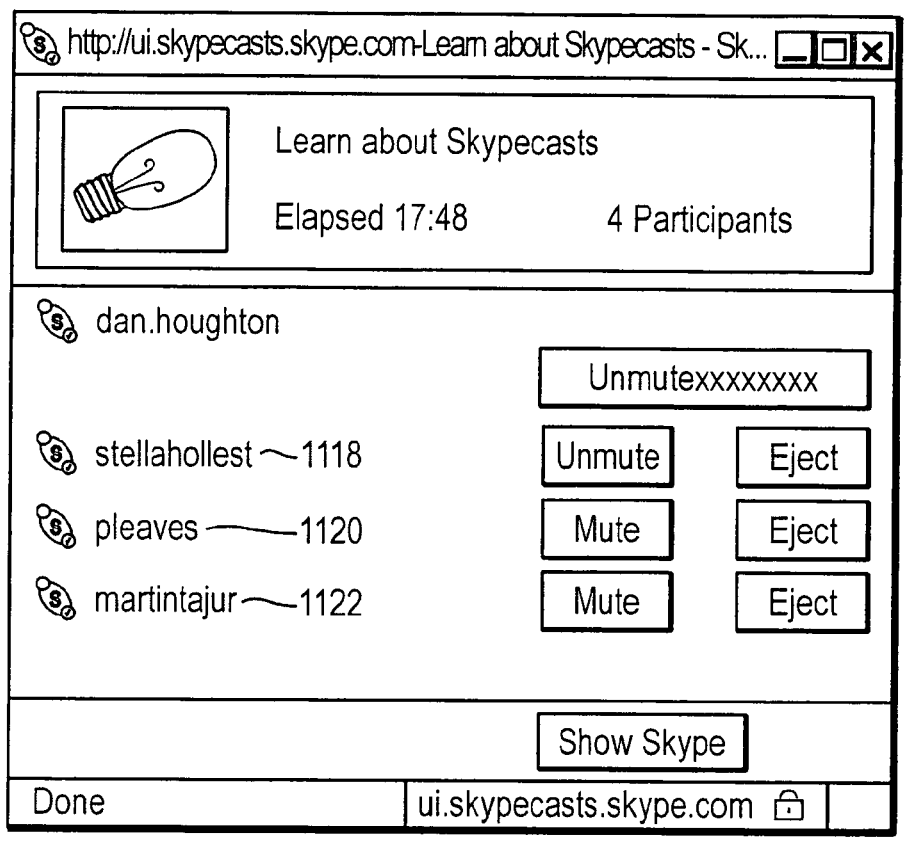

When a conference is in operation, the host user has control over the way in which the conference is run. FIGS. 11A-C show the control window presented to the host of an ongoing conference. The control window 1100 displays the title of the conference 1102, the elapsed time of the conference 1104 and the number of participants in the conference 1106. The participants in the conference are shown in a list 1108 within the control window 1100. The control window may not be large enough to view all the participants in the conference, and if so scroll bar is provided to allow the user to scroll through the full list of participants.

Unlike traditional telephone conferences, the host user has control over which participants are able to speak at any one time. This is because a large number of participants are able to take part in the conferences, and if many of them are speaking simultaneously the discussion becomes unintelligible. The host user can select which of the participants are able to speak in the conference. In other words, the host can select which of the participants will be muted (i.e. not heard by any of the other participants in the conference) or unmuted (i.e. can be heard by all of the other participants in the conference). The host has buttons 1110 next to each participant to mute them. In addition, the host has a "Mute Everyone" button 1112, which will mute every participant in the conference (apart from the host). The effect of activating the "Mute Everyone" button 1112 can be seen in FIG. 11B, where all participants are muted. The buttons 1114 next to the participants are now labelled "Unmute", as all the participants are currently muted. In addition, the button 1116 is now labelled "Unmute Everyone", and can be activated to unmute all the participants. FIG. 11C shows the case where one participant 1118 is muted, and two participants 1120, 1122 are unmuted.

If a participant is muted and wishes to speak in the conference he must first request to be unmuted (or "request the microphone") from the host. The conference window displayed to a participant in the conference (not the host) is shown illustrated in FIG. 12A. This window 1200 shows similar information to the host's control window in FIG. 11A-C, but also includes a button 1202 for requesting the microphone from the host.

When the participant requests the microphone from the host, this is indicated to the host by the icon 1124 flashing (or alternatively animating or changing colour) in the control window 1100 in FIG. 11A (the same icon is also shown in the participants window 1200 to indicate who is requesting the microphone). The host can choose to let the user speak in the conference by using the mute/unmute button 1110 shown next to the participant. The host may choose to only give the microphone to a single user at a time, or the host may give it to several users or to all participants. This allows the conference to be controlled in an effective way if there are many participants present. For example, the host may give the microphone to a small group of people, such as a "panel", who can talk freely on a subject, and then may request questions from the remainder of the participants. The participants can request the microphone to ask their question of the "panel", who can respond accordingly.

Figures 12A, 12B:
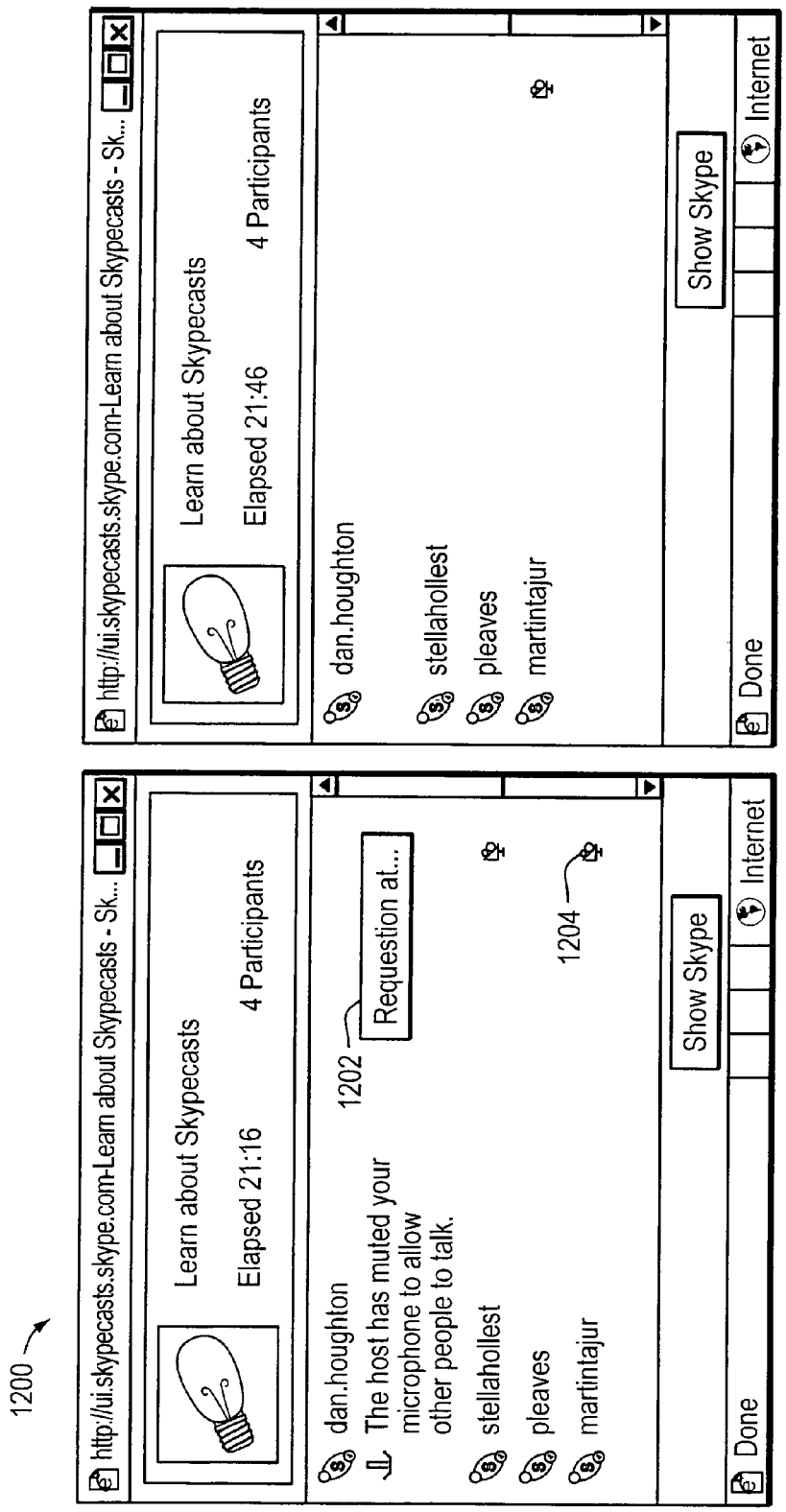
FIGS. 12A-B show a control window presented to the participant of an ongoing conference.

The participants that are currently speaking and those requesting the microphone are brought to the top of the list of participants shown in both the host's control window 1100 and the window 1200 of the participants, so that they may be easily viewed by the users. Icons 1204 are shown next to the names of the participants in the window 1200 to indicate if the user is currently muted or not. This allows all the participants to easily identify who is speaking in the conference, which is useful when a large number of participants are present. FIG. 12B shows the case where the participant is not currently muted, and can be heard by all the participants of the conference. The button to request the microphone from the host is not present in this case, as the user is unmuted, and hence already "has the microphone".

In addition to muting a participant or allocating a participant the microphone, the host can also eject a participant from the conference. This may be useful if, for example, the user is being disruptive to the conference discussion. The host may do this by using the buttons 1126 shown in FIG. 11A.

Figure 13:
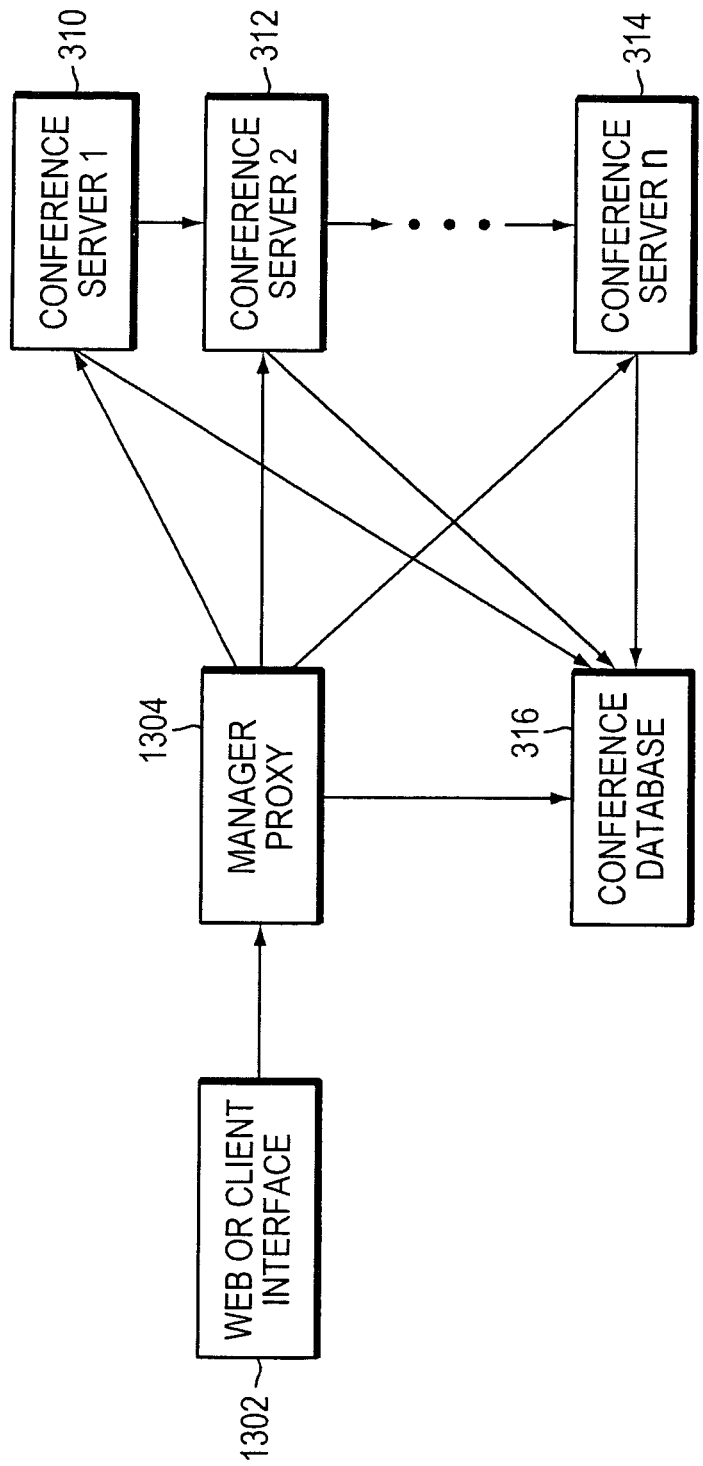
FIG. 13 shows the network elements used to control a conference.

The network elements used to control the conference are shown illustrated in FIG. 13. The elements shown in FIG. 13 control the booking, updating and deleting of conferences as well as the muting, unmuting and removal of users from the conference. A web or client interface 1302 (such as the client of the host or a web page for booking a conference) can connect to a manager proxy 1304. The web or client interface 1302 may connect to the manager proxy 1304 via other elements, but these are beyond the scope of this application. The manager proxy 1304 acts as a single point of contact for managing the conference. This is required since the users participating in the conference may be spread over several different servers, and the manager proxy 1304 allows the client to contact a single centralised entity, which can then manage the requests to the different servers as appropriate. The manager proxy is connected to the conference database 316 and conference servers 310-314 (discussed previously with reference to FIG. 3). The manager proxy 1304 receives a request from the web or client interface (e.g. to remove a user) and determines the particular server to which this request should be directed.

Reference is now made to FIGS. 14A and 14B, which illustrate two embodiments for implementing the muting of participants in the conference. FIGS. 14A and 14B show a host user 102 with a user terminal 104 running a client 106. The host user is controlling an ongoing conference, which is being run on the conference server 202. Connected to the conference server 202 is a participant 108 with a user terminal 110 executing a client 112. This is the same scenario as illustrated previously in FIG. 2. The host 102 wishes to mute the audio stream coming from the participant 108.

FIG. 14A illustrates an embodiment in which the muting is performed at the conference server. The client 112 on the participant's user terminal 110 is receiving the mixed audio stream from the conference server, as indicated by the arrow 1402. Speech from the participant 108 is encoded by the client 112 into an audio stream and transmitted to the conference server 202, as represented by arrow 1404. However, since the host 102 has muted the participant 108, the conference server does not distribute the speech from the participant 108 to all the other participants. Instead, the conference server discards the audio stream from the participant 108. This is represented in FIG. 14A by the "muting point" 1406 being located at the conference server 202. This embodiment has the advantage of providing a simple centralised way of muting the users. However, it does have the disadvantage of wasting bandwidth, as the audio stream 1404 is sent from the participant to the conference server, only to be discarded.

FIG. 14B illustrates the second embodiment in which the muting is performed at the client. As before, the client 112 on the participant's user terminal 110 is receiving the mixed audio stream from the conference server, as indicated by the arrow 1402. However, as well as sending the mixed audio stream to the participant 108, the conference server 202 is also transmitting muting information to the client 112. The client 112 is informed that the host 102 has muted the participant 108, and therefore does not encode any speech from the participant 108, and does not transmit the audio stream 1404 to the conference server 202. This is represented in FIG. 14B by the "muting point" 1408 being located at the client 112.

The embodiment in FIG. 14B has the advantage of saving bandwidth between the participant and the conference server, as the audio stream is not transmitted to the conference server unless it is needed. However, this embodiment does require more information to be sent to the client from the conference server.

The above-described system and method provides an effective way of delivering voice-based group communication to a large group of people. The use of the Internet allows the conferences be scheduled in advance and can be open for anyone to join and discuss a subject. This allows large groups of people to discuss issues in a controlled way, with a scalable and reliable server architecture to ensure that the large numbers of participants can be supported.

A known alternative method used for discussion between large groups of people is through online forums and chat rooms. An online forum is usually run over the World Wide Web, and allows a large number of users to discuss a subject through the posting of messages in the form of text, which are then visible to all users of the forum in a chronological order. Subjects that are being discussed are often advertised on a webpage, and a user can join the discussion by reading the messages posted to date and then adding their own message to the discussion. A user can also create a new discussion (known as a thread) by posting a first message under a new subject, which can then be responded to by other users. The problem with an online forum is that it is limited in its interactivity. A user of the forum can post a message, but then must wait until another user has read the message and written and posted a response before getting a reply. This causes a considerable delay between the posting of a message and the response. However, an online forum does avoid the problems described hereinabove with reference to telephone conferences comprising large numbers of participants.

A variation of an online forum that allows a greater degree of interactivity is known as a chat room. A chat room operates in a similar manner to the forum described above, but the text typed by the user is transmitted in real time. Therefore, participants in the chat room can engage in a form of conversation in which a message is typed and transmitted instantly to all participants in the chat room, and can be immediately responded to by another user. An example of a known protocol used in chat rooms is Internet relay chat ("IRC"). Despite chat rooms providing a greater degree of interactivity than message-based online forums, they are still significantly less interactive than speech. The act of typing invariably delays the response from a user to a larger degree than is present with speech. In addition, many users may be much more comfortable interacting with others through speech rather than text. The system and method described herein overcomes these problems by providing a technique for voice communication between large numbers of users, therefore providing the necessary degree of interactivity.

While this invention has been particularly shown and described with reference to preferred embodiments, it will be understood to those skilled in the art that various changes in form and detail may be made without departing from the scope of the invention as defined by the appendant claims.

What is claimed is:

1. A method of providing voice conferencing between a plurality of users over a communications network, the plurality of users comprising a host user and a plurality of participant users, the method comprising:

initiating a voice conference using a host user terminal configured to be connected to said communications network;

enabling the plurality of users to join the voice conference, wherein the user terminal of the host is configured to display a host user interface;

receiving, via said communication network, at least one request from at least one of the plurality of participant users joined on the voice conference to speak in the voice conference;

displaying, on the host user interface, an indication of the at least one request from the at least one of the plurality of participant users;

activating a selection control on the host interface effective to enable selection of at least one user from said plurality of participant users associated with the at least one request to speak in the voice conference wherein selection of said at least one requesting user of said plurality of participant users enables transmission of speech associated with said at least one selected user to all of the plurality of users over the communications network;

displaying a single common list of the plurality of users in the voice conference via the host user interface; and enabling display of the single common list via at least one participant user interface, wherein displaying the single common list via the host user interface and enabling display of the single common list via the at least one participant user interface comprises:

moving said at least one selected user and said at least one requesting user of said plurality of participant users from respective locations within the single common list to one or more top positions of the single common list displayed via the host user interface; and notifying the at least one participant user interface of said at least one selected user and said at least one requesting user of the plurality of users effective to move each selected user and each requesting user from respective locations within the single common list displayed via the at least one participant user interface to one or more top positions of the single common list displayed via the at least one participant user interface.

2. A method according to claim 1, further comprising blocking the speech from other users that have not been selected.

3. A method according to claim 1, wherein the list of the plurality of users in the voice conference indicates which of the plurality of users has been selected to speak in the voice conference.

4. A method according to claim 1, further comprising activating a muting control associated with a participant user displayed on the host user interface, wherein activating the muting control associated with the participant user blocks the speech of the associated participant user.

5. A method according to claim 1, further comprising activating a muting control associated with the plurality of participant users displayed on the host user interface, wherein activating the muting control associated with the plurality of participant users blocks speech of each of the plurality of participant users from being transmitted.

6. A method according to claim 4, further comprising enabling blocking the speech from the participant user associated with the muting control at a server in the communications network.

7. A method according to claim 4, further comprising enabling blocking the speech from the participant user associated with the muting control at client software associated with said blocked participant user.

8. A method according to claim 1, further comprising activating a removal control associated with a participant user displayed on the host user interface, wherein activating the removal control button associated with the participant user removes said participant user associated with the removal control button from the voice conference.

9. A method according to claim 1, wherein initiating a voice conference further comprises enabling display of details associated with the voice conference to the plurality of users.

10. A user terminal device having one or more processors configured to provide voice conferencing over a communications network, comprising:
a client executed at the user terminal device for joining a user associated with the user terminal device to a voice conference, the client further configured to:
display a user interface on the user terminal device, the user interface comprising a request control for requesting to speak in the voice conference;
transmit a request message to a user terminal device associated with a host user while joined on the voice conference in response to the activation of the request control, wherein the request control is not present on the user interface when the user terminal has permission to speak in the voice conference;
display a single common list of users in the voice conference;

receive from the user terminal device associated with the host user one or more notifications indicating which one or more users in the voice conference are selected to speak and which one or more users in the voice conference are requesting to speak;
responsive to receiving the one or more notifications, moving the one or more users selected to speak in the voice conference and the one or more users requesting to speak in the voice conference from their respective locations in the single common list to top locations in the single common list; and
responsive to determining the user associated with the user terminal device is blocked from speaking in the voice conference, block transmission of speech associated with the user at the user terminal device.

11. A user terminal device having one or more computer processors configured to provide voice conferencing over a communications network, comprising:
a client executed at the user terminal device for joining a user of the user terminal device to a voice conference, the client further configured to:
display a user interface on the user terminal device comprising an indication that at least one user in the voice conference is requesting to speak in the voice conference while joined on the voice conference, the user interface further comprising a plurality of selection controls, each selection control singularly corresponding to a user of the plurality of users, the plurality of selection controls configured to enable selecting multiple users requesting to speak in the voice conference, the speech of said multiple selected users being transmitted to all of the users in the voice conference over the communications network in response to the activation of said selection controls;
display a single common list of users in the voice conference;
move said multiple selected users that have been selected via the user terminal device to speak in the voice conference and users requesting to speak in the voice conference from their respective locations in the single common list to top locations of the single common list;
enable display of the single common list of users in the voice conference at each user terminal device associated with the voice conference; and
notify each user terminal device of said multiple selected users and said requesting users effective to move said multiple selected users and said requesting users to at least one top location of each respective single common list at each user terminal device.

12. A computer program product comprising at least one computer-readable storage device having computer readable code embodied therewith which when executed by one or more computer processors causes the one or more processors to provide voice conferencing between a plurality of users over a communications network, the plurality of users comprising a host user and a plurality of participant users by:
initiating, using a host terminal device configured to connect to said communications network and associated with the host user, a voice conference;
enabling, using the host terminal device, the plurality of users to join the voice conference via client software configured to execute at each respective user terminal device, and further enabling display of a participant user interface at each of the plurality of participant users' associated display responsive to joining the voice conference and display of a host user interface at the host user terminal device;

displaying, using the host terminal device, an indication on the host user interface of at least one request message from at least one of the plurality of participant users, each request message being associated with a participant user of the plurality of participant users and configured to indicate a request from the participant user to speak in the voice conference;

activating, using the host terminal device, at least one selection control from a plurality of selection controls displayed on the host interface, each selection control associated with a different participant user from the plurality of participant users, wherein activation of each selection control enables transmission of speech associated with said selected participant user to all of the plurality of users over the communications network;

enabling, using the host terminal device, display of a single common list of the plurality of users in the voice conference at each participant user interface and the host user interface;

moving each said selected participant user and each said requesting participant user from their respective locations in the single common list on the host user interface to at least one top location of the single common list on the host user interface; and notifying each participant user interface of each said selected participant user and each said requesting participant user effective to move each said selected participant user and each said requesting participant from their respective locations in the single common list at each participant user interface to at least one top location of the single common list at each participant user interface.

13. A method of providing voice conferencing between a plurality of users over a communications network, the plurality of users comprising a host user and a plurality of participant users, the method comprising:

joining, using a user terminal device associated with a participant user of the plurality of participant users and configured to connect to the communications network, a voice conference, wherein on joining the voice conference, the user terminal device displays a participant user interface;

activating, using the user terminal device, a request control on the participant user interface while joined on the voice conference;

responsive to activation of the request control, transmitting, using the user terminal device associated with the participant user, a request message via said communication network to a user terminal device associated with the host user, the request message configure to indicate a request to speak in the voice conference;

responsive to receiving control to speak in the voice conference, removing the request control from the participant user interface;

displaying at the participant user interface, using the user terminal device associated with the participant user, a single common list of the plurality of users in the voice conference;

receiving, from the user terminal device associated with the host user, at least one notification of each participant user of the plurality of participant users that have been selected to speak in the voice conference and each participant user of the plurality of participant users who have requested to speak in the voice conference;

responsive to receiving the at least one notification, moving each participant user that has been selected to speak in the voice conference and each participant user who has requested to speak in the voice conference to at least one top location of the single common list; and blocking, using the user terminal device associated with the participant user, speech associated with the participant user responsive to the participant user being blocked from speaking in the voice conference.

14. A system for providing voice conferencing between a plurality of user terminals over a communications network, the plurality of user terminals comprising a host user terminal and a plurality of participant user terminals, the system comprising:

means to enable a participant user terminal of the plurality of user terminals to join to a voice conference;

means to enable display of a participant user interface on the participant user terminal, the participant user interface comprising a request control for requesting to speak in the voice conference;

means to transmit a request message to the host user terminal while joined on the voice conference in response to the activation of the request control;

means to enable display of a single common list of the users of the plurality of user terminals in the voice conference on the participant user interface and a host user interface associated with the host user terminal;

means to receive at least one notification from the host user terminal indicating which users of the plurality of users terminals have been selected to speak in the voice conference and which users of the plurality of user terminals have requested to speak;

means to move said users selected to speak in the voice conference and said requesting users to at least one top location of the single common list; and means to display, for each said requesting user, an icon configured to indicate a transmitted request to speak.

15. A user terminal device according to claim 11, wherein the user terminal device is further configured to block transmission of speech associated with users that have not been selected to speak to all of the users in the voice conference over the communications network.

16. A user terminal according to claim 11, wherein the single common list of users in the voice conference indicates which of the plurality of users has been selected via the user terminal device to speak in the voice conference.

17. A user terminal according to claim 11, wherein the user interface further comprises a muting control associated with a user in the voice conference, and wherein the user terminal device is further configured to enable blocking the speech of the associated user in response to activation of said muting control.

18. A user terminal device according to claim 17, wherein the user terminal device is further configured to enable blocking the speech of said blocked user at a server in the communications network.

19. A user terminal device according to claim 17, wherein the user terminal device is further configured to enable blocking the speech of said blocked user via a client associated with said blocked user.

20. A user terminal device according to claim 11, wherein the user interface further comprises a removal control associated with a user in the voice conference, and wherein the user terminal device is further configured to enable removal of the associated user from the voice conference in response to activation of the removal control.

21. A user terminal device according to claim 11, wherein the user interface further comprises a muting control associated with multiple users in the voice conference, and wherein the user terminal device is further configured to enable blocking transmission speech associated with each of the multiple users in response to the activation of said muting control.

* * * * *